United States Patent
Beshai et al.

(10) Patent No.: US 7,082,132 B1
(45) Date of Patent: Jul. 25, 2006

(54) UNIVERSAL EDGE NODE

(75) Inventors: Maged E. Beshai, Stittsville (CA); Harold G. Edwards, Sterling, VA (US); Paul F. Daspit, San Diego, CA (US)

(73) Assignee: Nortel Networks Limited, St. Laurent (CA)

( * ) Notice: Subject to any disclaimer, the term of this patent is extended or adjusted under 35 U.S.C. 154(b) by 973 days.

(21) Appl. No.: 10/025,982

(22) Filed: Dec. 26, 2001

(51) Int. Cl.
*H04L 12/28* (2006.01)
*H04Q 11/00* (2006.01)

(52) U.S. Cl. .................. 370/391; 370/386; 370/395.4

(58) Field of Classification Search ............ 370/230, 370/230.1, 231–235, 236.1, 395.1, 395.4, 370/395.41, 395.43, 368, 477, 375, 386, 370/391, 468
See application file for complete search history.

(56) References Cited

U.S. PATENT DOCUMENTS

| | | | |
|---|---|---|---|
| 5,168,492 A | 12/1992 | Beshai et al. | |
| 5,745,486 A | 4/1998 | Beshai et al. | 370/352 |
| 5,881,049 A | 3/1999 | Beshai et al. | 370/230 |
| 5,905,711 A * | 5/1999 | Chiussi et al. | 370/232 |
| 6,134,217 A * | 10/2000 | Stiliadis et al. | 370/232 |
| 6,240,096 B1 * | 5/2001 | Book | 370/412 |
| 6,307,852 B1 | 10/2001 | Fisher et al. | 370/352 |
| 6,356,546 B1 | 3/2002 | Beshai et al. | 370/358 |
| 6,512,743 B1 * | 1/2003 | Fang | 370/232 |
| 6,643,259 B1 * | 11/2003 | Borella et al. | 370/231 |
| 6,721,325 B1 * | 4/2004 | Duckering et al. | 370/395.4 |
| 6,798,743 B1 * | 9/2004 | Ma et al. | 370/235 |
| 2003/0035374 A1 * | 2/2003 | Carter et al. | 370/235 |

FOREIGN PATENT DOCUMENTS

EP 0 980 168 A2 2/2000

OTHER PUBLICATIONS

U.S. Appl. No. 09/244,824, filed Feb. 4, 1999, Beshai et al.—'Rate Controlled Multi-Class High-Capacity Packet Switch'.
U.S. Appl. No. 09/286,431, filed Apr. 6, 1999, Beshai et al.—'Self-Configuring Distributed Switch'.
U.S. Appl. No. 09/630,190, filed Aug. 1, 2000, Beshai et al.—'Courteous Routing'.
U.S. Appl. No. 10/054,509, filed Nov. 13, 2001, Beshai et al.—'Time-Coordination in a Burst-Switching Network'.
U.S. Appl. No. 09/960,959, filed Sep. 25, 2001, Beshai—'Switched Channel-Band Network'.

* cited by examiner

*Primary Examiner*—Chau Nguyen
*Assistant Examiner*—Ahmed Elallam

(57) ABSTRACT

A universal electronic switching node serves as an edge node in a high-capacity network with an optical core. The universal edge node may handle a variety of traffic classes and may control traffic admission, connection definition, connection routing and core node configuration. The provided capabilities significantly simplify network operation and control. The universal edge node includes input ports for receiving data streams, output ports for transmitting the data streams though the optical core, a switching fabric for communicating these data streams between input and output ports and a controller for controlling this communicating. In particular, the controller can select a route through the optical core, schedule the communication between input and output ports and adaptively allocate the bitrate of this communication.

23 Claims, 27 Drawing Sheets

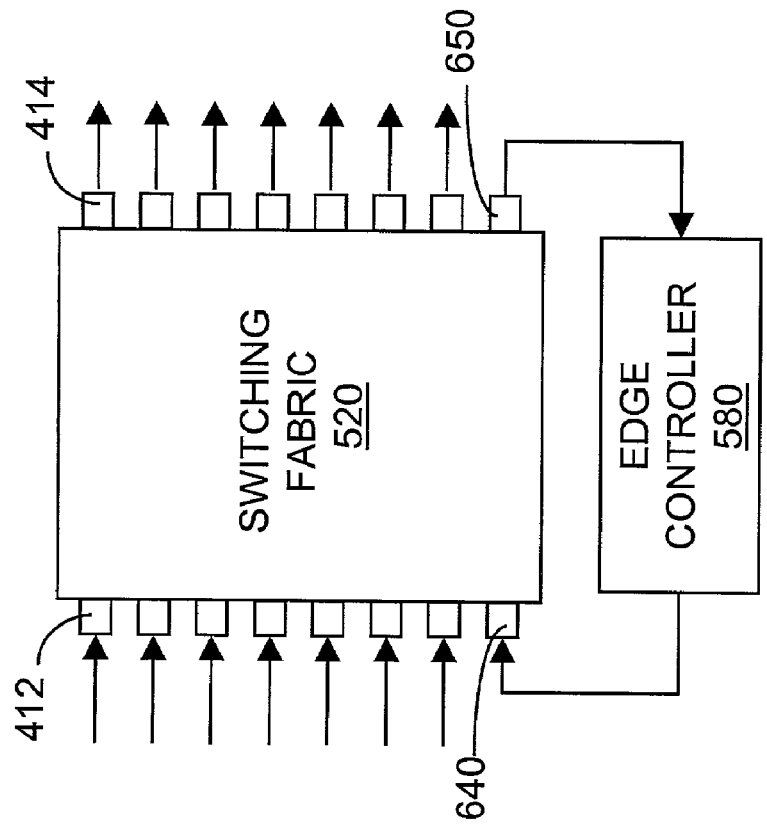
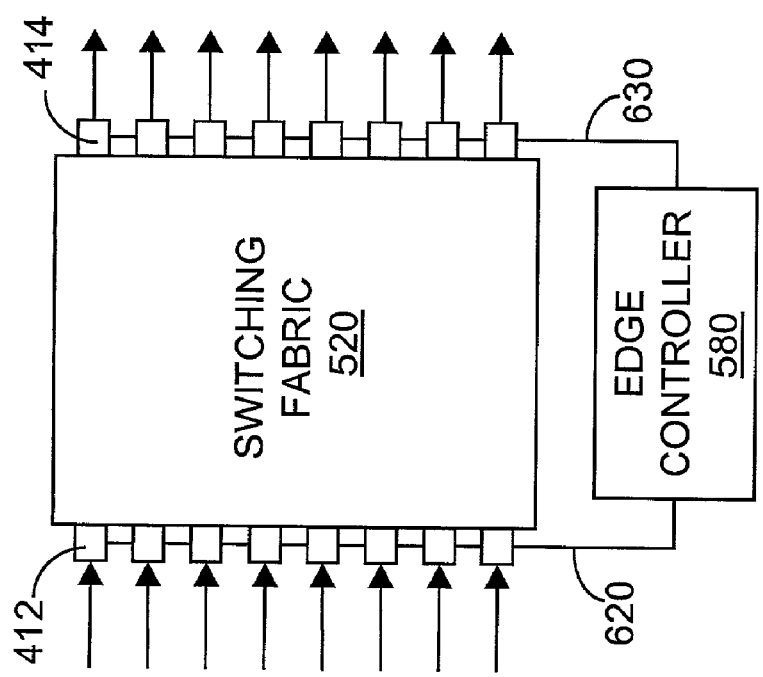

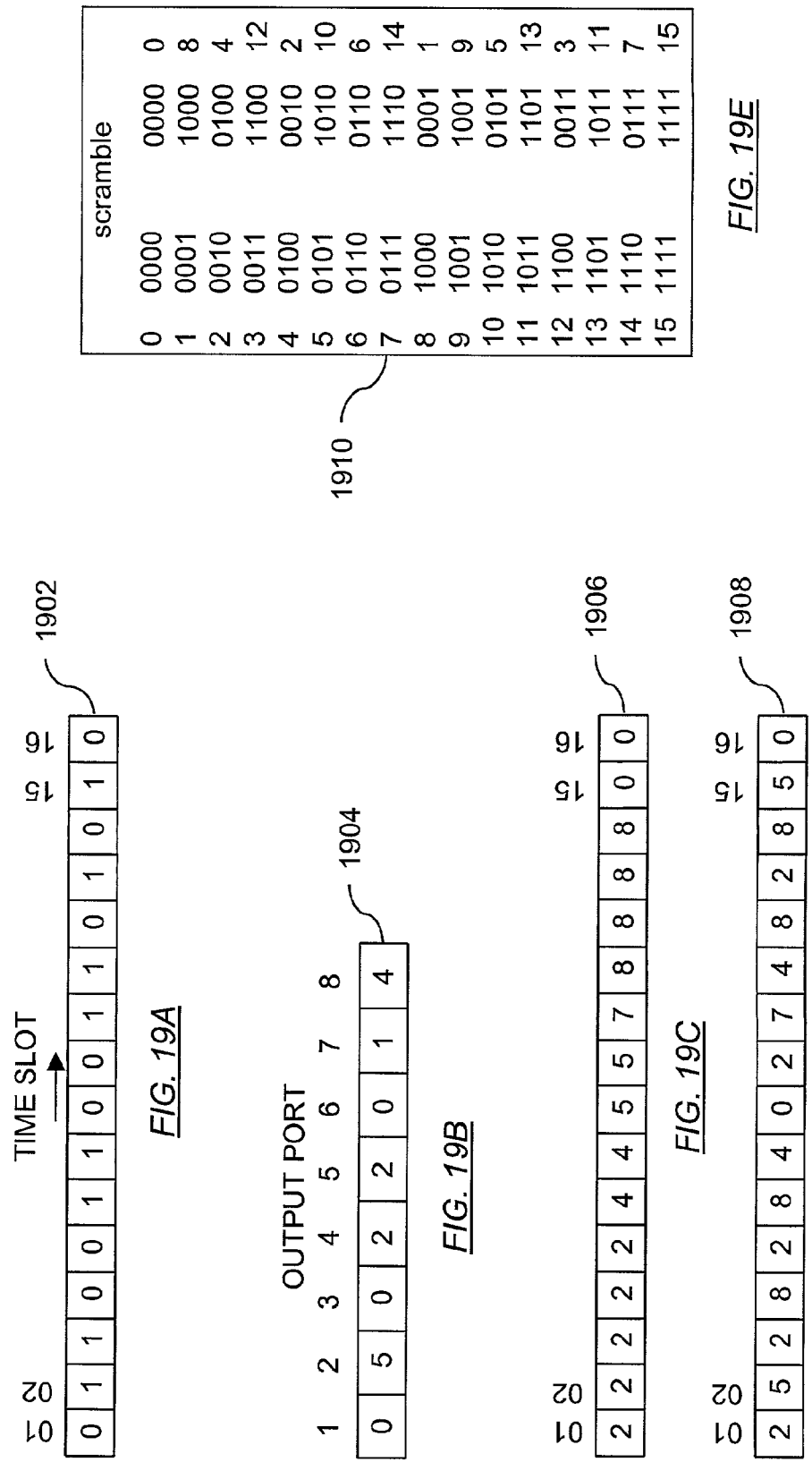

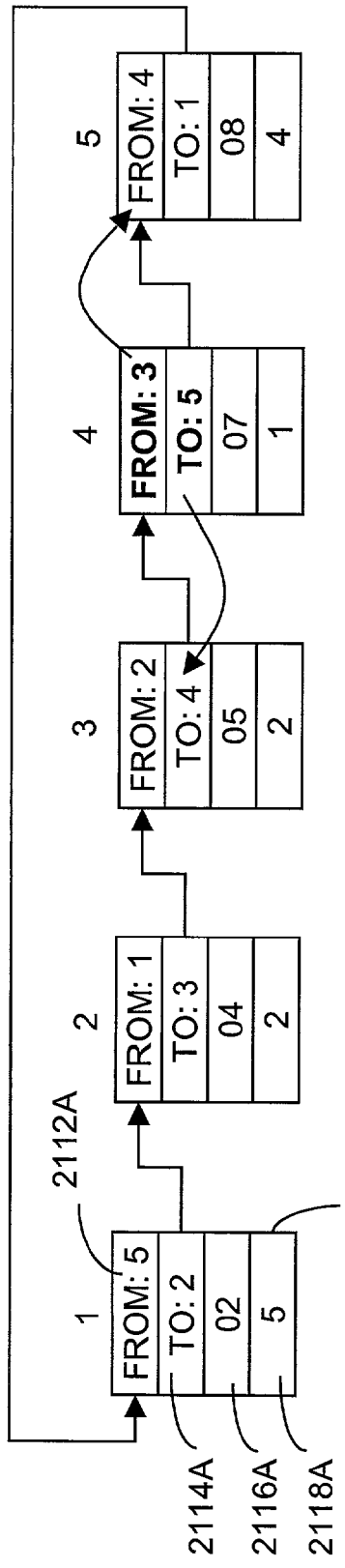
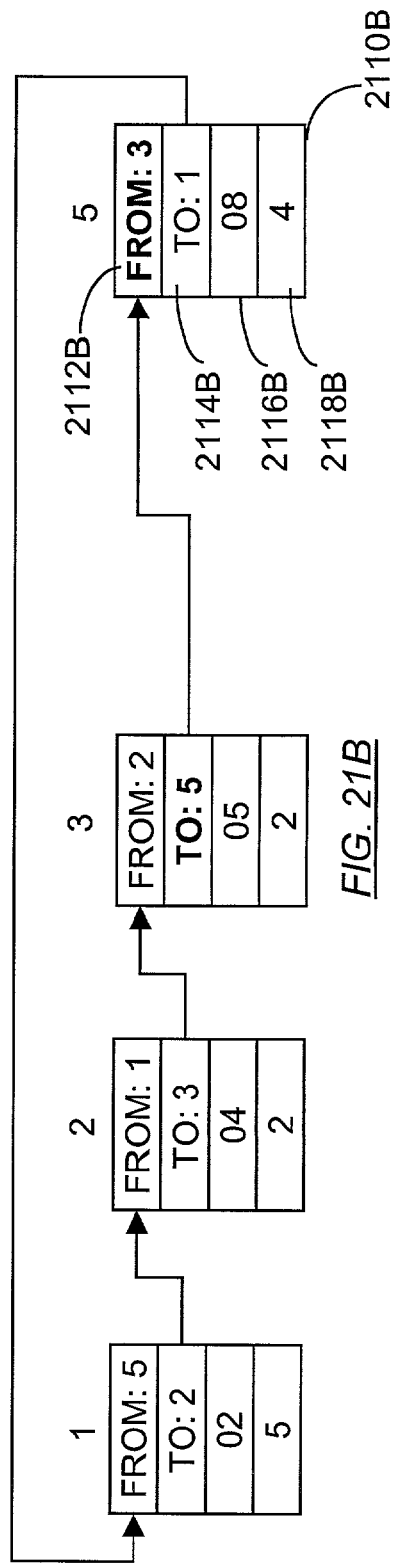
*FIG. 21A*
*FIG. 21B*

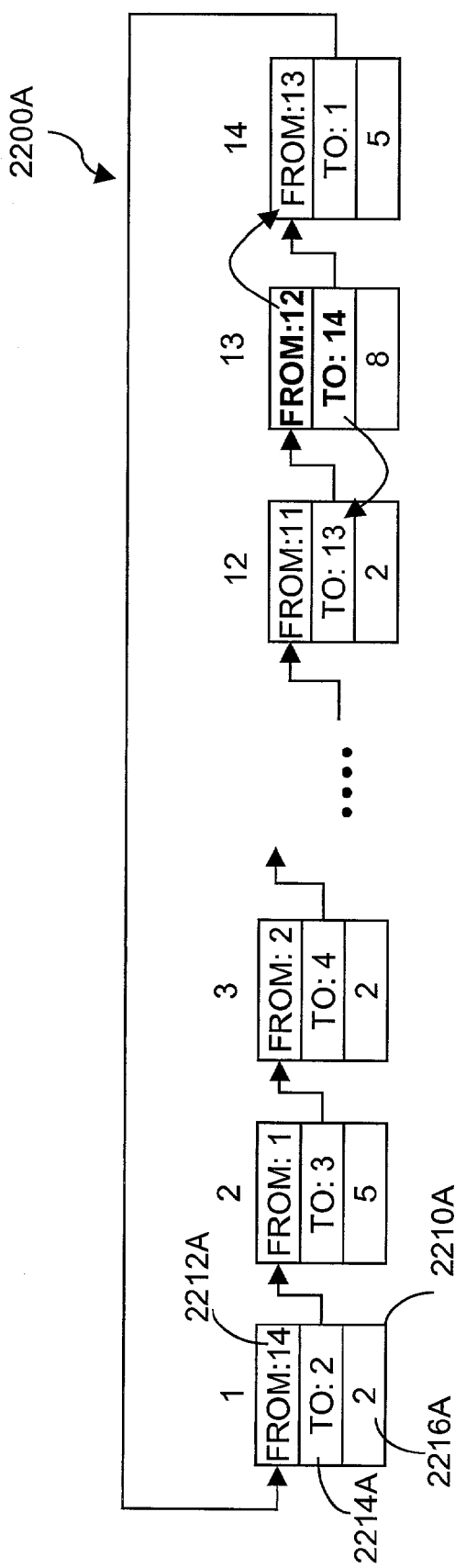
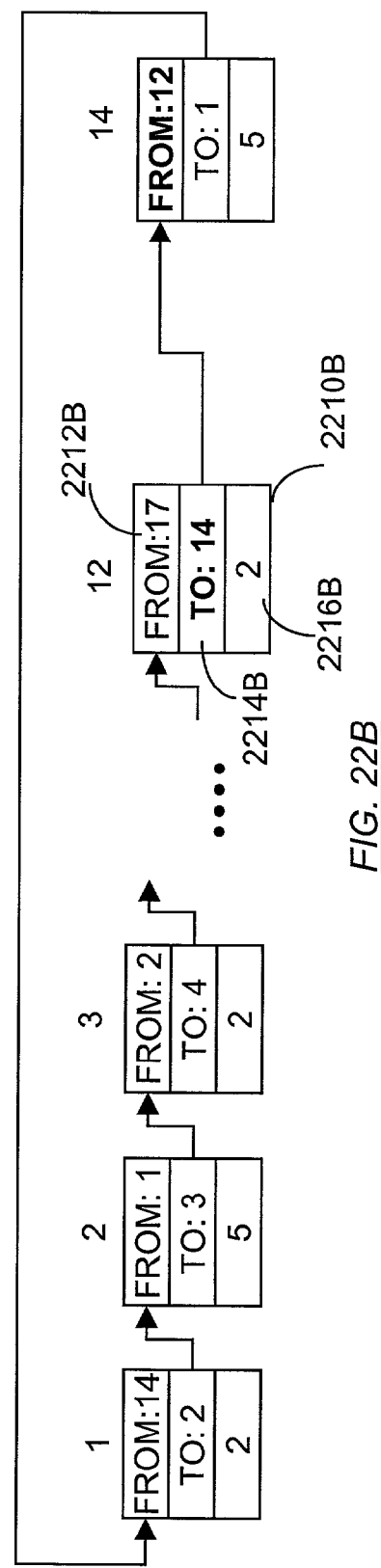
FIG. 22A
FIG. 22B

UNIVERSAL EDGE NODE

GOVERNMENT LICENSE RIGHTS

This invention was made with Government support under Technology Investment Agreement F30602-98-2-0194 awarded by the Air Force. The Government has certain rights in the invention.

FIELD OF THE INVENTION

The present invention relates to high-speed data traffic processing and, in particular, to a universal edge node that is used in multi-service switching of high-speed data traffic.

BACKGROUND

Data networks are generally constructed using a number of edge switches, also called edge nodes, that are connected to local data sources and data sinks. An edge node consists of a source node and a sink node that may share a common controller. The edge nodes are interconnected by a network core that switches traffic between edge nodes. The network core may be distributed and it may include several geographically distributed core nodes. The network core may also be agile, being able to reconfigure to follow fluctuating traffic demands.

Links interconnecting the edge nodes and the core nodes support communications paths for transferring data between edge nodes. Each of the communications paths has a predetermined granularity defined as an integer multiple of a capacity unit. A capacity unit is the minimum capacity, in bits/s, that can be assigned to a traffic stream. Paths of uniform granularity have been traditionally used in data networks.

The performance, efficiency and scalability of a data network depend heavily on a property of the nodes in the network called "degree" (nodal degree) and on a property of the network, which is directly related to the nodal degree, called "network diameter". The degree of a specific node is a measure of the number of nodes to which the specific node directly connects. The diameter of a network is a measure of the maximum number of hops (links) in the shortest path between any two nodes. The higher the nodal degree, the smaller the network diameter. A small network diameter generally yields both high performance and high efficiency. On the other hand, for a given nodal degree, scalability generally increases with the network diameter, but to the detriment of network efficiency. It is therefore advantageous to increase the nodal degree to the highest limit that technology permits.

The number of sink nodes to which the source node can send traffic, without the traffic having to be switched at an intermediate edge node, is directly related to the nodal degree of the source node. The nodal degree of a source node is also related to the number of output ports supported by the source node and the speed of switching by the source node. In particular, a fine switching granularity (requiring relatively fast switching) provides a greater nodal degree than a coarse switching granularity. An electronic edge node is inherently fast switching, thereby enabling the division of the capacity of the output ports into relatively small units. To match this capability of the source node, an optical core node is required to be fast switching.

In one known scheme of optical-fiber link capacity division, the links that connect nodes are divided into channels, where each channel is associated with a wavelength. The nodal degree of a source node in this scheme is limited by the number of channels emanating from the source node, which is typically significantly smaller than the number of edge nodes in the network.

In another scheme of link capacity division, links or channels are divided according to a system of time sharing. Time sharing enables fine switching granularity and, hence, a high nodal degree. Schemes based on effective time sharing typically require: (a) that the edge nodes be time-locked to the core nodes; (b) that all nodes be fast switching; and (c) that a path between two edge nodes traverse a single optical core node. A node X is said to be time-locked to a node Y if, at any instant of time, the reading of a time-counter at node X equals the sum of a reading of an identical time-counter at node Y and the propagation time from node X to node Y, where the time-counters at nodes X and Y have the same period and the propagation delay is expressed in the same time unit in which the counter reading is expressed. Thus, if an edge node is time-locked to a core node and the edge node transmits a pulse to the core node when the edge node time-counter reading is $\tau$, the pulse should arrive at the core node when the core node time-counter reading is $\tau$.

Time Division Multiplexing (TDM) and burst switching are two systems of time sharing. At an edge node using TDM, data is organized in a time-slotted frame of a pre-defined duration. Data traffic from a source node to a sink node may be allocated at least one time slot. In burst switching, data packets are aggregated, at an edge node, into bursts, where the bursts are generally of different duration. Each burst is switched at the core node towards the destination sink node of the burst. At the sink node, the burst may be disassembled into constituent data packets. Systems of time sharing can be exploited to increase the nodal degree and, by so doing, reduce the network diameter. The application of TDM in an optical-core network is described in Applicant's U.S. patent application Ser. No. 09/960,959, filed on Sep. 25, 2001 and titled "Switched Channel-Band Network," the specification of which is incorporated herein by reference.

This division of capacity of optical links, provided by these schemes and others, allows a data stream, transmitted from a source node, to specify a level of service required while being transferred to a sink node, perhaps via one or more core nodes. It is then a necessity of the source node to have a service-quality control system to receive the requirement specified for the data stream and provide, if possible, the specified requirement.

The present-day Internet employs routers that were not built with the flexibility required to incorporate service-quality control in a scalable network. Additionally, the introduction of new services and new capabilities in the current Internet requires expensive patchwork and may result in a complex, engineering-intensive, difficult-to-control network.

Clearly, there exists a need for an edge node that incorporates service-quality control capabilities, and enables the construction of agile networks, i.e., networks that can efficiently accommodate wide variation of the spatial and temporal distribution of traffic, and that can transfer data streams having widely varied requirement and adapt to provide various levels of service.

With diverse transfer rate requirements, which may vary from a few Kb/s to a few Gb/s, there is a need for an edge node that is capable of efficiently handling extremes in transfer rate and distribution of traffic, and adaptively modifying path capacities without unmanageable control complexity.

There is also a need for an edge node that provides data-rate control and can work with an optical core node

SUMMARY

The present invention enables the construction of agile networks that require minimal engineering. A universal electronic switching node serves as an edge node in a high-capacity network with an optical core. The universal node may handle a variety of traffic classes and may control traffic admission, connection definition, connection routing and core node configuration. The provided capabilities significantly simplify network operation and control.

In accordance with an aspect of the present invention there is provided an edge node adapted to serve a multiplicity of data streams. The edge node includes a plurality of input ports adapted to receive the data streams, wherein each of the input ports includes an input-port controller and at least one of the input ports includes a bitrate-estimation device adapted to compute a bitrate requirement for each of the data streams, a plurality of output ports, wherein each of the output ports includes an output-port controller and at least one of the output ports includes a time locking device adapted to control a data transmit time from the at least one of the output ports, a switching fabric adapted to connect any of the input ports to any of the output ports and an edge controller. The edge controller includes an edge control processor adapted to communicate with the plurality of input ports and the plurality of output ports, a route selection device, in communication with the edge control processor, adapted to select a route for each of the data streams, a fabric scheduling device, in communication with the edge control processor, adapted to determine a distinct time of transfer for each of a set of data segments, into which each of the data streams are segmented, across the switching fabric and a bitrate-allocation device, in communication with the edge control processor, adapted to allocate a bitrate of a data stream based, at least in part, on bitrate requirement for the data stream computed by the bitrate-estimation device.

In accordance with another aspect of the present invention there is provided a method of determining a bitrate requirement for a connection. The method includes receiving a packet, where the packet includes an indication of a type for the connection, determining, from the indication, a type for the connection, if the connection is determined to be of a first type, extracting an explicit bitrate-allocation requirement from the packet, if the connection is determined to be of a second type, computing the bitrate requirement from parameters characterizing the traffic associated with the connection and if the connection type is determined to be of a third type, deducing the bitrate requirement from data stream monitoring.

In accordance with a further aspect of the present invention there is provided an edge node for high-speed traffic processing. The edge node includes a switching fabric, a plurality of input ports in communication with the switching fabric, each of the plurality of input ports having an input-port controller, a plurality of output ports in communication with the switching fabric, each of the plurality of output ports having an output-port controller and an edge node controller in communication with the switching fabric, each of the input-port controllers and each of the output-port controllers. The edge node controller includes a high-speed scheduling device, the high-speed scheduling device operable to receive bitrate allocation information from at least one input-port controller, maintain a state of a given input port associated with the at least one input-port controller, maintain a state of each of the plurality of output ports, assign time slots of a scheduling frame to communicate data segments from the given input port to one or more of the output ports, where the number of the time slots allocated to a given output port is based on the bitrate allocation information and transmit the scheduling frame to the corresponding input-port controller.

In accordance with a still further aspect of the present invention there is provided a method of data scheduling in an edge node. The method includes receiving bitrate allocation information from an input-port controller, maintaining a state of a given input port associated with the input-port controller, maintaining a state of each of a plurality of output ports, assigning time slots of a scheduling frame to communicate data segments from the given input port to one or more of the output ports, where the number of the time slots allocated to a given output port is based on the bitrate allocation information and transmitting the scheduling frame to the input-port controller. In a further aspect of the invention, a device is provided for high-speed scheduling according to this method.

In accordance with an even further aspect of the present invention there is provided a method of scheduling a transfer of data segments through a switching fabric from a plurality of input ports of the switching fabric to a plurality of output ports of the switching fabric wherein a scheduling frame having a predetermined number of time slots and an equal, predetermined duration is associated with each of the plurality of input ports. The method includes dividing the duration of each scheduling frame into a plurality of time windows, dividing the plurality of input ports into input-port groups, for each scheduling frame, forming a plurality of non-intersecting scheduling domains, where each scheduling domain associates one of the input-port groups with one of the plurality of time windows, concurrently executing scheduling processes, one scheduling process for each of the non-intersecting scheduling domains, each scheduling process determining a schedule that indicates, for a given scheduling domain, a timing for a transfer of data segments to selected ones of the plurality of output ports from the input ports associated with the time window in the given scheduling domain and, at least where the executing does not use all the time windows of a given scheduling frame, repeating the forming and the executing for permutations of the input-port groups and time windows.

In accordance with still another aspect of the present invention there is provided, in an edge node comprising a plurality of input ports, a plurality of output ports and a switching fabric, a fabric-scheduling apparatus. The fabric-scheduling apparatus includes a plurality of input-port scheduling devices, where each of the input-port scheduling devices is associated with an input-port group and each input-port group is a sub-set of the plurality of input ports, each of the input-port scheduling devices including: a receiver adapted to receive bitrate allocations from controllers of the plurality of input ports and translate each bitrate allocation into translated bitrate allocations, where each translated bitrate allocation indicates a required number of time-slots for a predefined scheduling frame duration, a ring-list generator adapted to form a ring-list from the translated bitrate allocations received from the receiver, a ring-list time-slot assignment circuit adapted to: receive the ring-list from the ring-list generator; perform an assignment of each time-slot in a predefined time-slotted scheduling frame to a transfer of a data segment from one of the input ports in the input-port group associated with the input-port scheduling devices to one of the plurality of output ports;

and modify the ring-list to reflect the assignment, a ring-list memory adapted to maintain the modified ring-list and a plurality of output-state memory devices, each of the output-state memory devices associated with a predefined time window and an access-control device is adapted to cyclically connect each of the input-port scheduling devices with each of the output-state memory devices.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 6A schematically illustrates one manner of communication between an edge node controller, input ports and output ports according to an embodiment of the present invention;

FIG. 6B schematically illustrates another manner of communication between an edge node controller, input ports and output ports according to an embodiment of the present invention;

FIG. 19A illustrates a state-vector of an input port in the edge node of FIG. 7, for use with an embodiment of the present invention;

FIG. 19B illustrates a demand vector indicating the number of time slots per time-frame for each output port in an edge node, for use with an embodiment of the present invention;

FIG. 19C illustrates alternate representation of the demand vector of FIG. 19B where each entry corresponds to an output port;

FIG. 19D illustrates the demand vector of FIG. 19C with scrambled entries for use with an embodiment of the present invention;

FIG. 19E illustrates a prior-art reverse-binary scrambling rule;

FIG. 21A illustrates the structure of a ring-list having a ring of data records, for use in an embodiment of the present invention;

FIG. 21B illustrates an update of the structure of the ring-list of FIG. 21A after the removal of one of the data records of the ring-list, for use in an embodiment of the present invention;

FIG. 22A illustrates an alternate structure of a ring-list wherein a data record is dedicated to each data segment, for use with an embodiment of the present invention;

FIG. 22B illustrates an update of the ring-list of FIG. 22A due to the removal of one of the data blocks, for use with an embodiment of the present invention.

DETAILED DESCRIPTION

Figure 1:
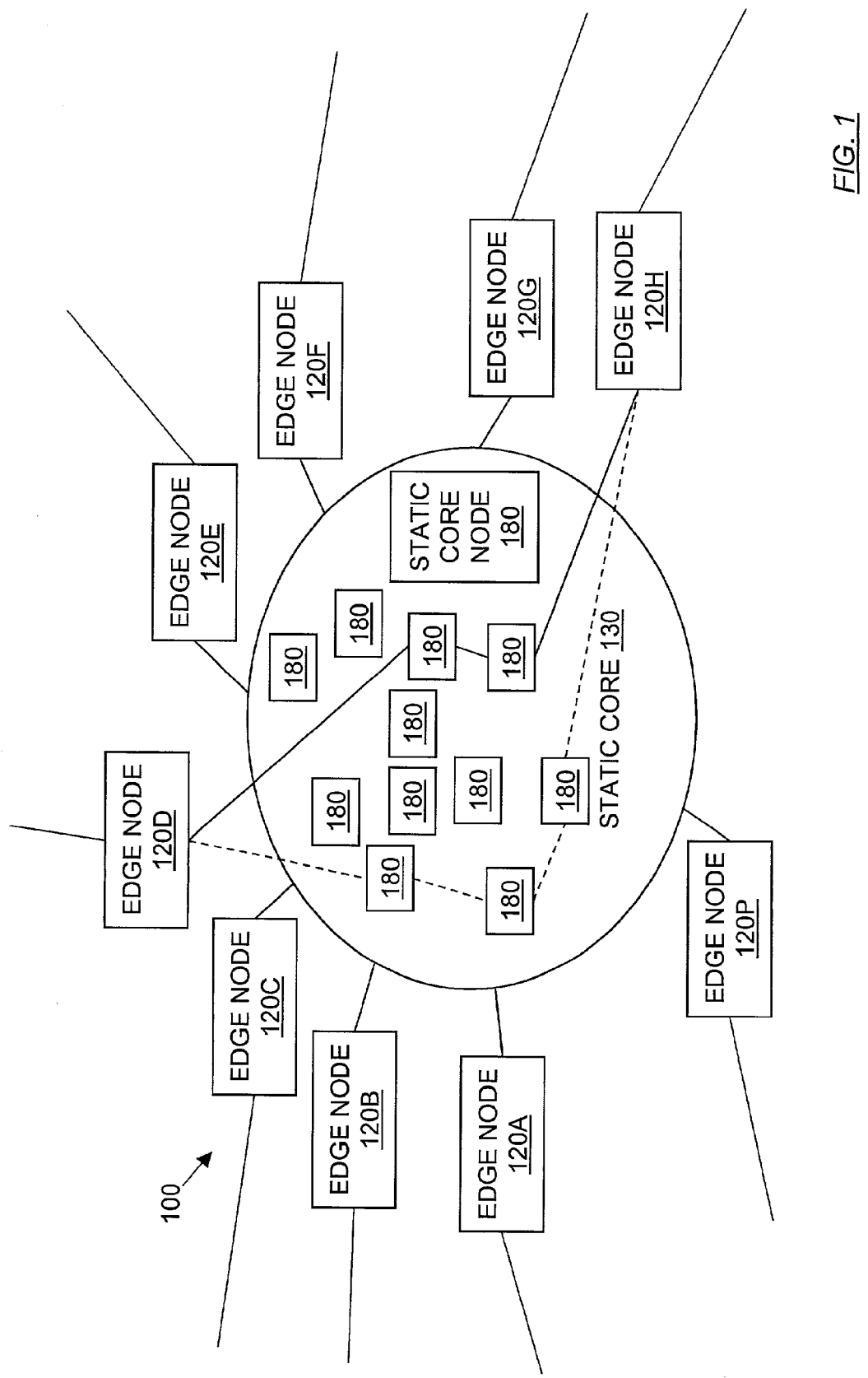
FIG. 1 illustrates a data network suitable for use with the present invention wherein a static core is used for communication between edge nodes.

FIG. 1 illustrates a network 100 of electronic edge nodes 120A, 120B, 120C, 120D, 120E, 120F, 120G, 120H, 120P (known herein individually or collectively as 120) interconnected by a static optical core 130, with each edge node 120 having a number of direct paths to the static optical core 130. The edge nodes 120 support traffic sources and sinks (not shown). The static optical core 130 is made up of a number of static core nodes 180. A static core node maintains its input-output connections pattern over an extended period of time. Core nodes 180 may be interconnected by optical-fiber links.

Figure 2:
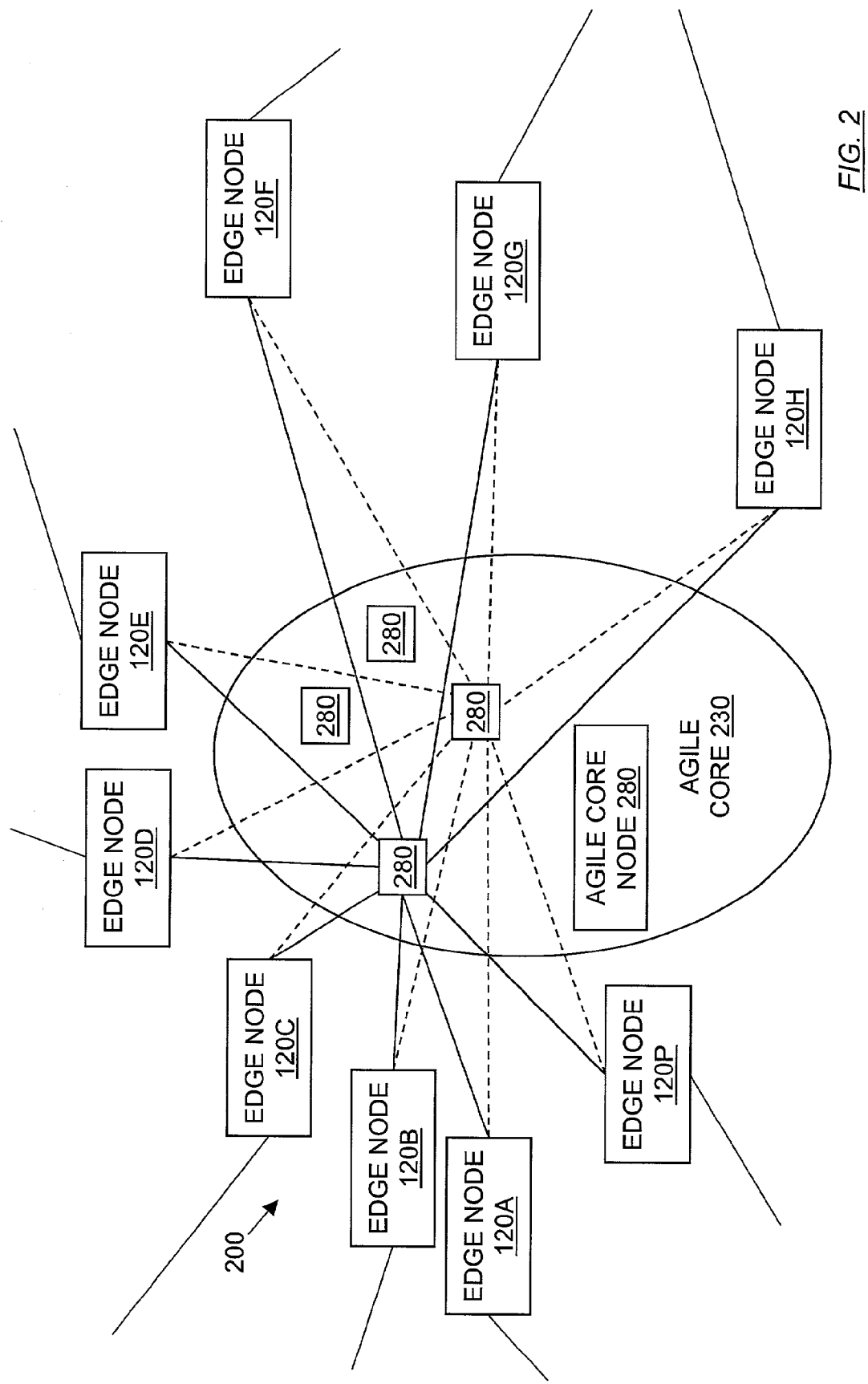
FIG. 2 illustrates a data network suitable for use with the present invention wherein an agile core is used for communication between edge nodes.

The static optical core 130 affords simplicity of control. However, the static optical core 130 can lead to inefficiency. A network that provides the capability to modify node-pair connectivity is highly desirable. The simplest network that enables core agility is a star network where edge nodes interchange data through a common core node. An exemplary star network is part of a larger network structure in FIG. 2. The edge nodes 120 can communicate with each other via a single agile core node 280. The main attractions of star network are high performance and simplicity of control. However, a star network is only suitable for limited geographic or topological coverage. A composite-star network 200, illustrated in FIG. 2, may be viewed as a superposition of several star networks which are merged only at the edge nodes 120 while the agile core nodes 280 can be widely distributed and independent. The agile core nodes 280 in an agile optical core 230 of a composite-star network are not connected to each other. The composite-star network retains the attractive properties of a star network while providing a wide geographic and topological coverage. The composite-star network will be used for the purpose of describing some of the embodiments of the present invention. A star network is treated as a component of a composite-star network.

Figure 3:
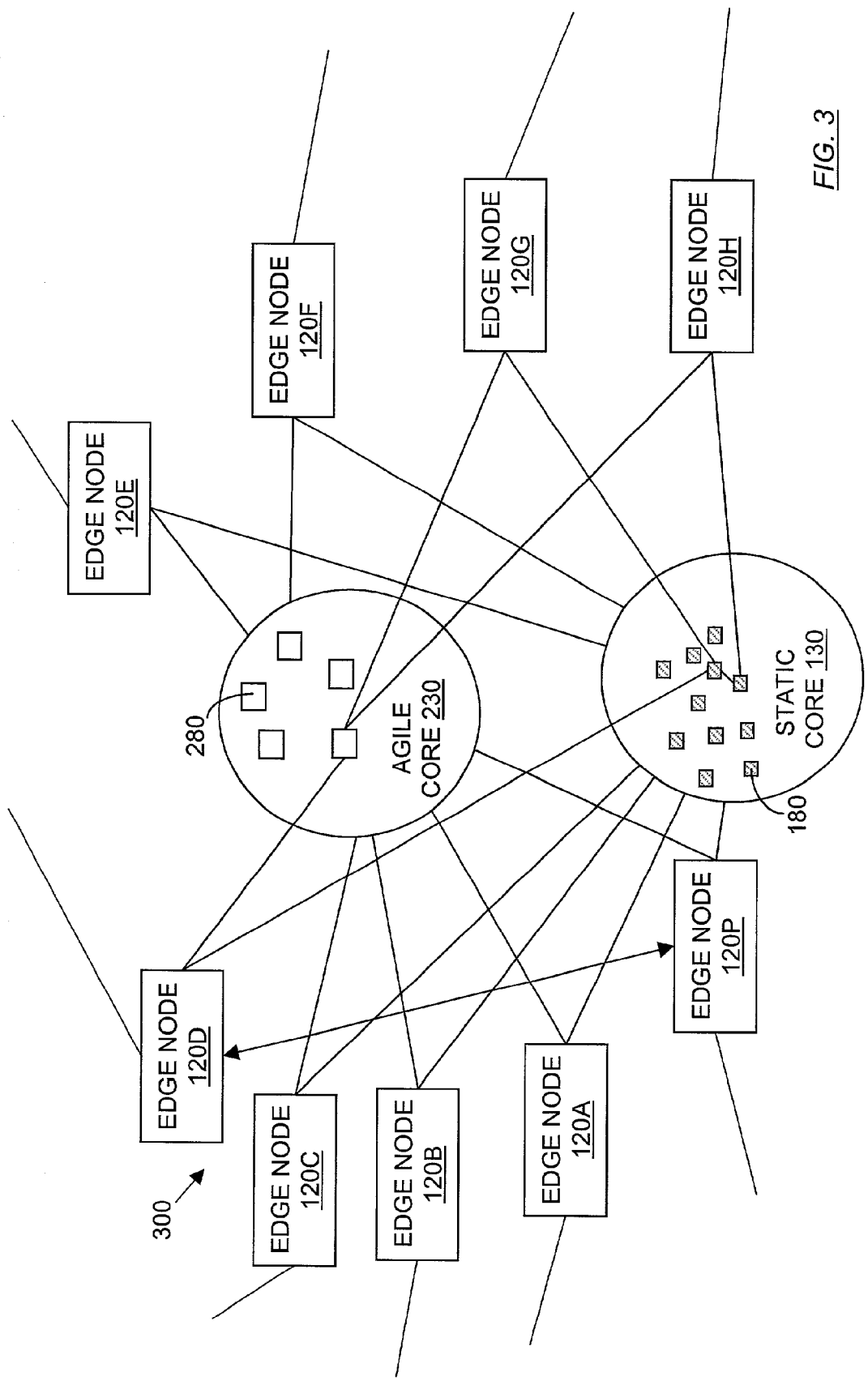
FIG. 3 illustrates a data network suitable for use with the present invention wherein both a static core and an agile core are used for communication between edge nodes.

A network can be constructed to combine both the static optical core 130 and the agile optical core 230 as depicted in a hybrid network 300 illustrated in FIG. 3 comprising a static core and an agile core. The static optical core 130 would be used to establish paths for data streams having predictable bitrate requirements. Such an arrangement requires the edge node 120 to have the capability to interface with both legacy networks that employ static core nodes 180 and new networks that employ agile core nodes 280.

Figure 4:
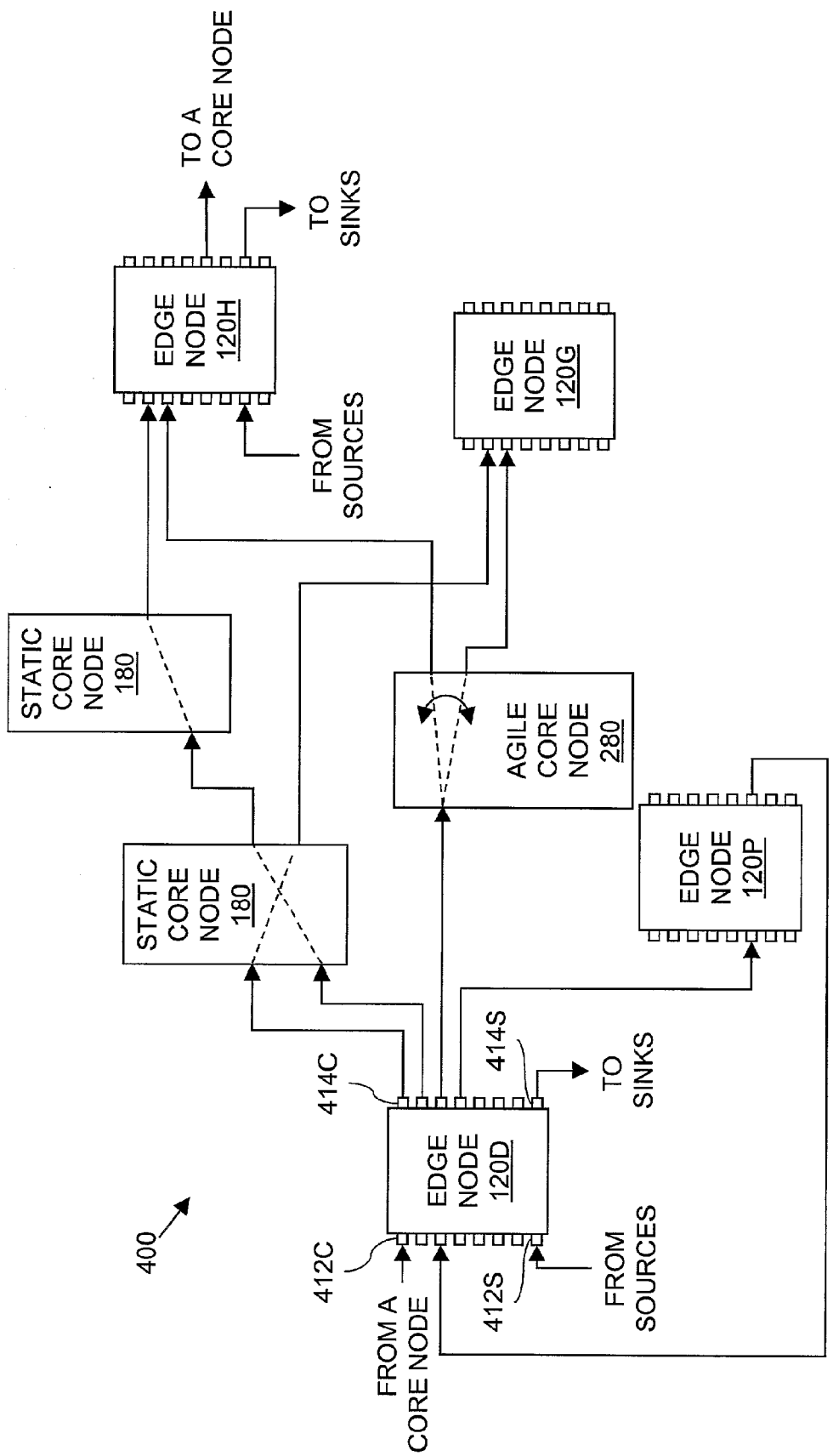
FIG. 4 illustrates the communication between specific ones of the edge nodes of FIG. 3 according to an embodiment of the present invention.

As illustrated in FIG. 4, each edge node 120 has a plurality of input ports 412 and a plurality of output ports 414. The number of input ports need not equal the number of output ports. The input ports 412 of the edge node 120 may be divided into source ports 412S, which receive data from data sources, and receiving ports 412C, which receive data from other edge nodes 120 or from core nodes 180, 280. Likewise. The output ports 414 of the edge node 120 may be divided into sink ports 414S, which deliver data to data sinks, and departure ports 414C, which send data to other edge nodes 120 or to core nodes 180, 280. Hereinafter, an upstream link of an edge node 120 refers to a link from the edge node 120 to another edge node 120 or to a core node 180, 280, and a downstream link of an edge node 120 refers to a link incoming to the edge node 120 from another edge node 120 or from a core node 180, 280. Upstream links connect to departure ports 412C of the edge node 120 and downstream links connect to the receiving ports 414C of the edge node 120.

The connections illustrated in FIG. 3 between edge nodes 120D, 120H, 120G and 120P are presented in a different format in FIG. 4. The format of FIG. 4 allows for the introduction of more detail for the edge nodes 120. In particular, the edge node 120D, which is upstream for most of the connections, is shown to receive input from traffic sources and from core nodes. The source port 412S is used to receive from sources, while the receiving port 412C is used to receive from core nodes. Similarly, the sink port 414S is used to send data to sinks and the departure port 414C is used to send data to core nodes.

A given network may be classified according to "switching granularity", i.e., according to the minimum size of a switched data unit or minimum data rate that may be switched in the given network, which may be determined by both spectral division and the time division of the telecommunication medium. FIG. 4 illustrates an example of a network that includes static core nodes 180 (also known as cross connectors) that connect entire channels from the input ports to respective output ports, and agile core nodes 280 that adaptively switch entire channels. An agile core node 280 is also capable of switching sub-channels using time-sharing schemes such as TDM (time-division-multiplexing) or burst switching.

Figure 5:
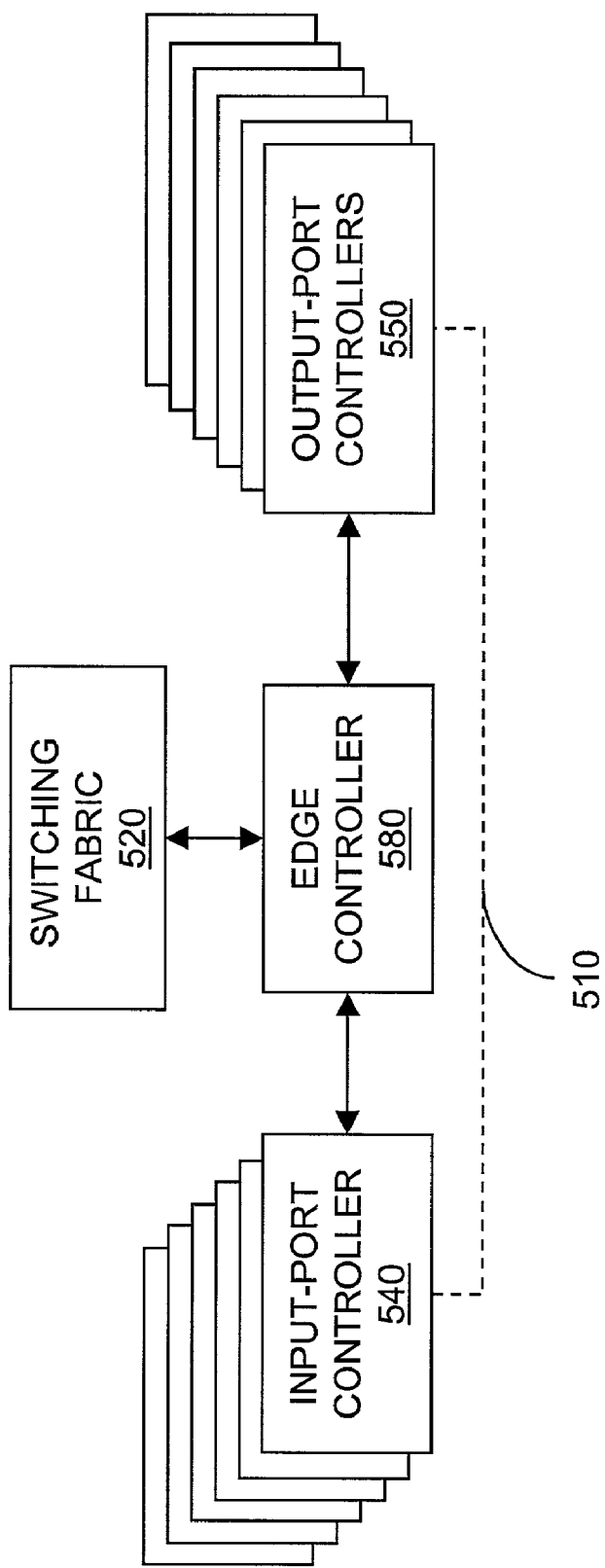
FIG. 5 schematically illustrates main components of an overall control mechanism of an edge node according to an embodiment of the present invention.

The main components of an overall control mechanism in a universal edge node 120 are illustrated in FIG. 5. The overall control mechanism comprises an edge node controller 580 which interacts with a plurality of input port controllers 540, each corresponding to an input port, a plurality of output-port controllers 550, each corresponding to an output port and a switching fabric 520. The input-port controllers 540 and the output-port controllers 550 may, in some embodiments, have an ability to exchange control data directly through an inter-port link 510.

The flexibility of each edge node 120 is enabled by the edge node controller 580. FIG. 6A and FIG. 6B illustrate two arrangements for connecting the edge node controller 580 to the input-port controllers 540 and the output-port controllers 550. In FIG. 6A and FIG. 6B the input-port controllers 540 and the output-port controllers 550 are not shown, but are understood to be associated with the source ports 412S, the receiving port 412C, the sink ports 414S and the departure ports 414C, which are shown.

In a first arrangement, illustrated in FIG. 6A, the input ports 412 and the edge node controller 580 exchange control messages on an input communication bus 620 while the output ports 414 and the edge node controller 580 exchange control messages on an output communication bus 630. In this arrangement, the number of input ports need not equal the number of output ports.

A second arrangement applies only to a symmetrical switch, i.e., where the number of input ports equals the number of output ports. An input port 412 may send control messages through the switching fabric 520 to a control output port 650 where the control messages are sent to the edge node controller 580. Additionally, the edge node controller 580 may send control messages to a control input port 640 where the control messages are sent through the switching fabric 520 to an output port 414. To send control messages to the edge node controller 580, an output port 414 may first send the control messages to an associated input port 412 using the inter-port link 510 (see FIG. 5). Similarly, control messages to an input port 412 may first be sent, by the edge node controller 580, to an associated output port 414 where the control messages may be sent to the input port 412 using the inter-port link 510. Notably, the control input port 640 and the control output port 650 are dedicated to control data and do not handle payload data.

Figure 7:
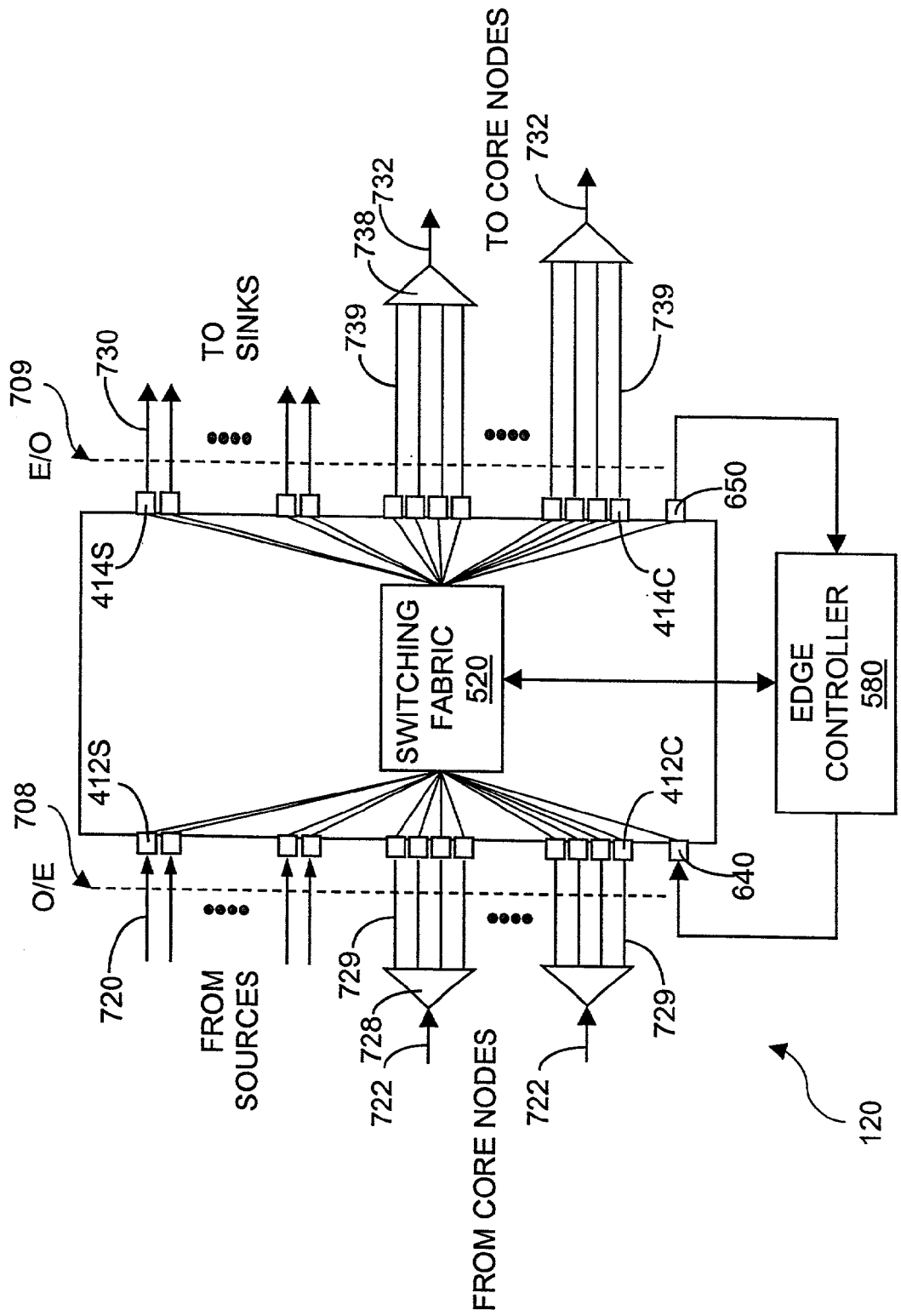
FIG. 7 schematically illustrates, in further detail, components of an edge node according to an embodiment of the present invention.

In FIG. 7, an edge node 120 supports local traffic sources and local traffic sinks (not shown). The source ports 412S receive data from local traffic sources and the receiving ports 412C receive data from traffic sources of other edge nodes 120 through core nodes 180, 280. Similarly, the sink ports 414S deliver data to local traffic sinks and the departure ports 414C send data to traffic sinks of other edge nodes 120 through core nodes 180, 280. A downstream link 722 using WDM (Wavelength-division multiplexing) is demultiplexed into individual wavelength input channels 729 at a WDM demultiplexer 728 and each wavelength input channel 729 connects to a receiving port 412C after optical-to-electronic (O/E) conversion at an Optical/Electrical interface 708. A plurality of departure ports 414C connect to a number of individual wavelength output channels 739 after an electrical-to-optical (E/O) conversion at an electronic/optical (E/O) interface 709. The wavelength output channels 739 are multiplexed at a WDM multiplexer 738 into an upstream link 732, which connects to a core node 180, 280 (not shown).

Using the control bus-interconnection illustrated in FIG. 6A, the edge node controller 580 communicates directly with the input-port controllers 540 and the output-port controllers 550. Where the switching fabric 520 is symmetrical (i.e., the number of input ports equals the number of output ports), the edge node controller 580 can use the control ports 640, 650 illustrated in FIG. 6B wherein the edge node controller 580 receives control data through the control output port 650 and sends control data through the control input port 640. Notably, it is possible, and may be necessary, to provide more than one control input port 640 and/or more than one control output port 650 in a given edge node 120.

The switching fabric 520 need not be symmetrical, i.e., the number of input ports need not equal the number of output ports. The inequality can be designed to accommodate such network-dependent conditions as significant traffic asymmetry and the use of multi-casting, wherein a data stream from a single source is sent to multiple sinks.

Figure 8:
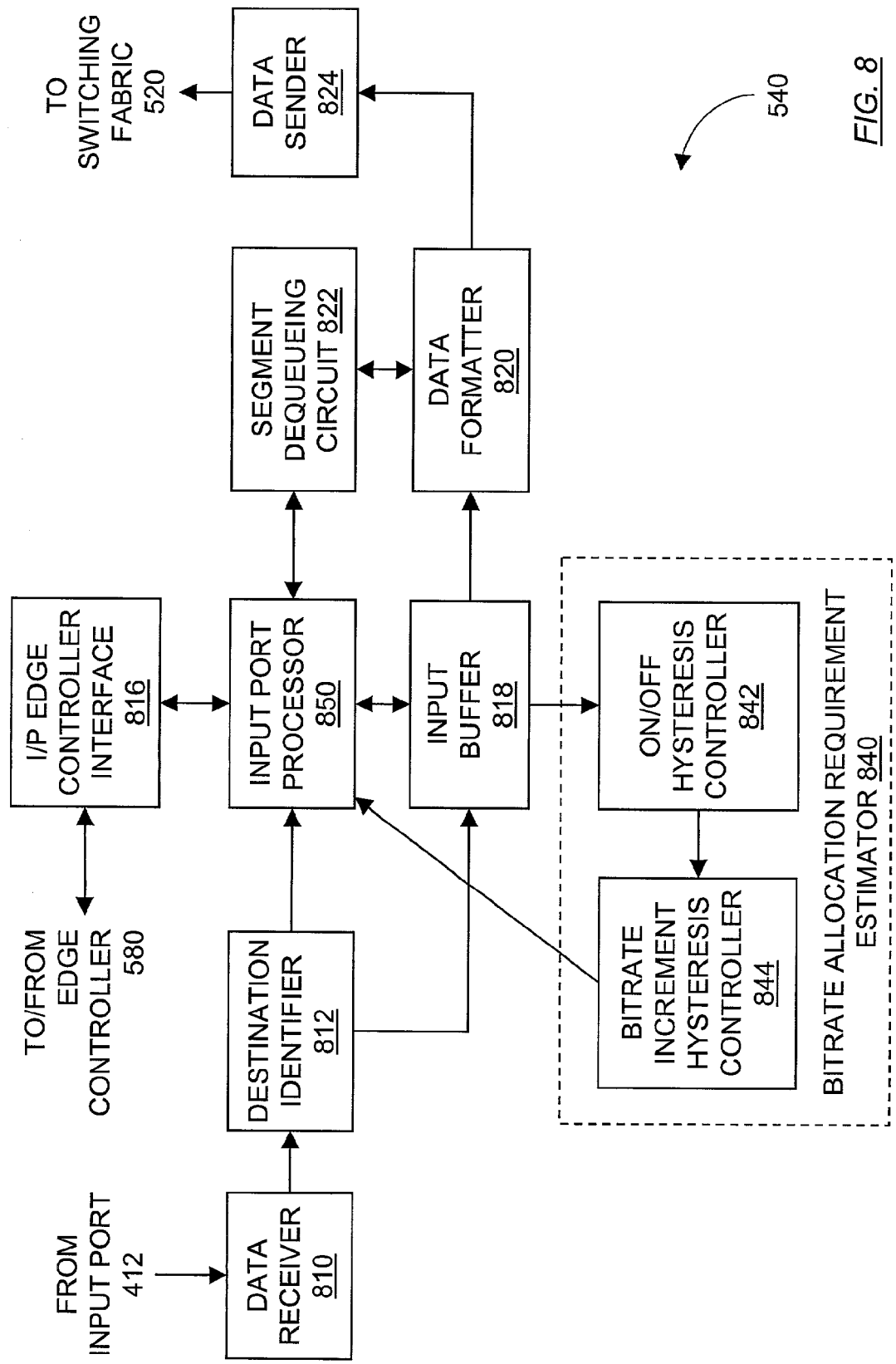
FIG. 8 schematically illustrates an input port controller according to an embodiment of the present invention.

The main components of the input-port controller 540 are illustrated in FIG. 8. A data receiver 810 receives data from the associated input port 412 and passes the data to a destination identifier 812 that determines, based on header information included in the data, the output port to which the data should be sent. Information regarding the amount of data and the destination output port of the data is sent to an input port processor 850 while the data itself is sent to an input buffer 818. The input port processor 850 communicates with the input buffer 818 to learn about the occupancy of the input buffer 818 and to specify a queue from which to send data to a data formatter 820. Occupancy information may also be sent from the input buffer 818 to a bitrate allocation requirement estimator 840. The bitrate allocation requirement estimator 840 includes an on/off hysteresis controller 842 and a bitrate increment hysteresis controller 844. Output from the bitrate allocation requirement estimator 840 enables the input port processor 850 to determine a bitrate at which to send individual data streams to the switching fabric 520. Determining when, and at what rate, to send data to the switching fabric 520 is determined by control messages received at the input port processor 850 from the edge node controller 580 via an input edge controller interface 816. Before being sent to the switching fabric 520, the data is formatted by the data formatter 820. Finally, a data sender 824 receives data from the data formatter 820 under the control of a segment dequeueing circuit 822. The data sender 824 then sends the data to the switching fabric 520.

Figure 9:
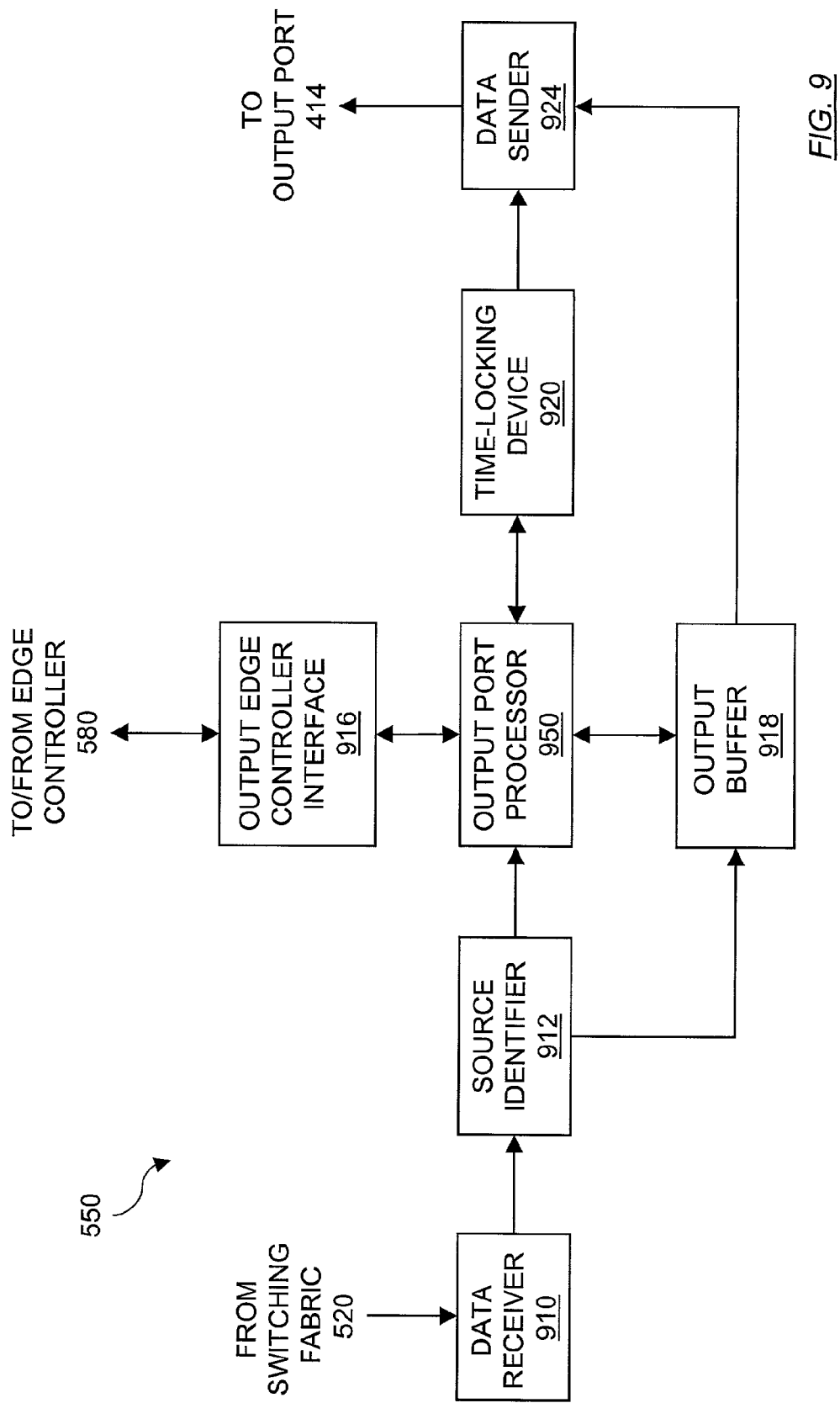
FIG. 9 schematically illustrates an output port controller according to an embodiment of the present invention.

The main components of the output-port controller 550 are illustrated in FIG. 9. Data is received from the switching fabric 520 at a data receiver 910. From the data receiver 910, the data is passed to a source identifier 912 at which the input port at which the data was sent to the switching fabric 520 is identified. The data, along with an indication of the identified input port is passed to an output buffer 918. Meantime, information regarding the amount of data and the source input port of the data is sent to an output port processor 950. The output port processor 950 communicates with a time-locking device 920, which communicates with a data sender 924. The data sender 924 is also in communication with the output buffer 918 to receive the data to be sent to the output port 414. Determining when to send data to the output port 414 is determined by control messages received at the output port processor 950 from the edge node controller 580 via an output edge controller interface 916.

A storage facility is provided as part of each input-port controller 540 in the form of the input buffer 818. A structure for queues in the input buffer 818 is illustrated in FIG. 10A. The input buffer 818 includes a control-data queue 1010 and a number of data queues 1020 equivalent to the number of output ports 414. The control-data queue 1010 is preferably maintained on a memory separate from the memory on which the data queues 1020 are maintained if the arrangement of FIG. 6A is used for communication between port controllers and the edge node controller 580. In the alternative arrangement of FIG. 6B, the data queues 1020 and the control-data queue 1010 are preferably maintained on the same memory.

Figure 10B:
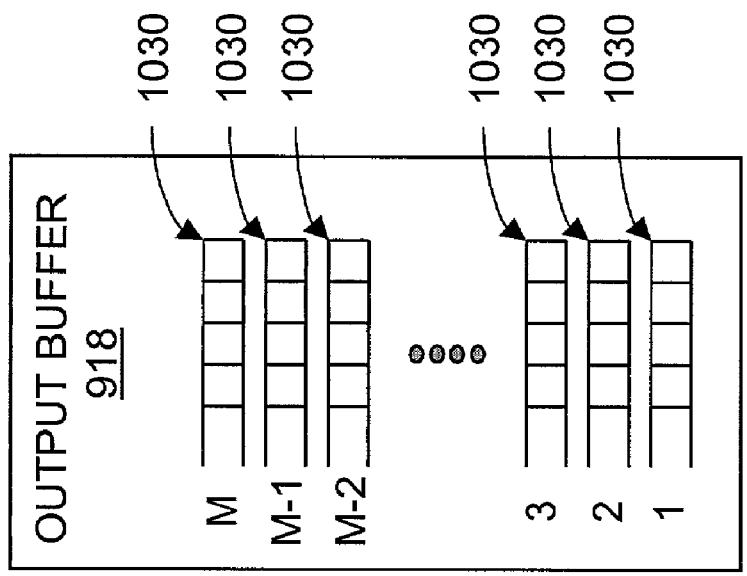
FIG. 10B illustrates the logical structure of an output buffer of the output port controller of FIG. 9 according to an embodiment of the present invention.
Figure 10A:
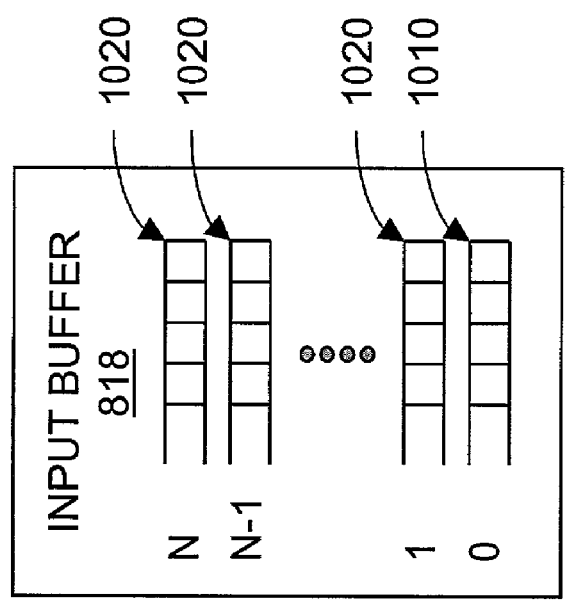
FIG. 10A illustrates the logical structure of an input buffer of the input port controller of FIG. 8 according to an embodiment of the present invention.

FIG. 10B illustrates an arrangement of queues for the output buffer 940. At an output port 414, in order to collate data segments belonging to the same packet, a number of output queues 1030 equivalent to the number of input ports 412 are required. This collation may be understood through a review of U.S. patent application Ser. No. 09/244,824, filed on Feb. 4, 1999, and titled "Rate-Controlled Multi-Class High-Capacity Packet Switch", (the specification of which is incorporated herein by reference).

Figure 11:
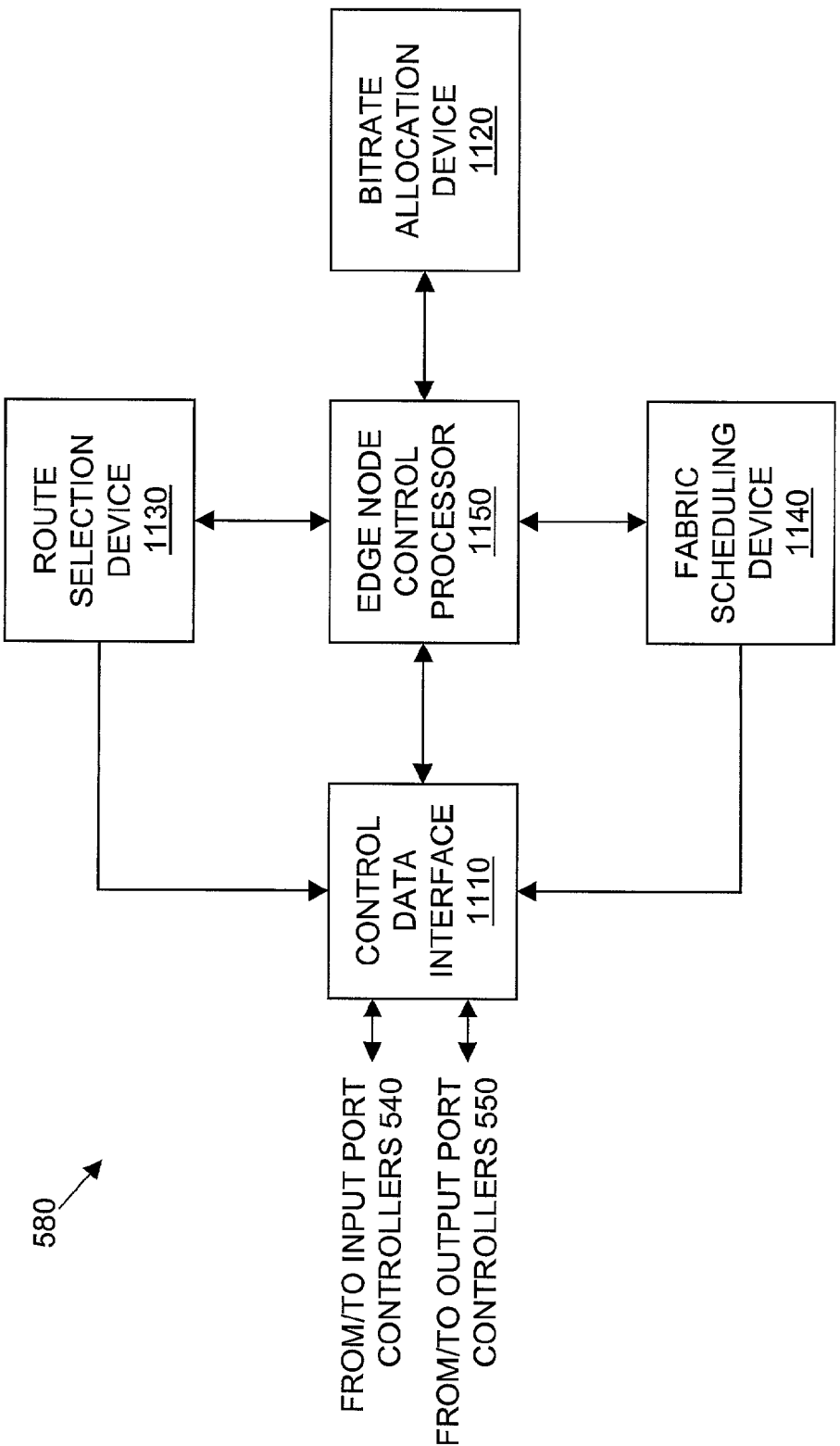
FIG. 11 schematically illustrates an edge controller according to an embodiment of the present invention.

The main components of the edge node controller 580 are illustrated in FIG. 11. A control data interface 1110 is used to send and receive control messages to and from the input-pot controllers 540 and the output-port controllers 550. An edge node control processor 1150 is central to the operation of the edge node controller 580 and therefor maintains a connection to a fabric scheduling device 1140, a route selection device 1130 and a bitrate allocation device 1120.

A data stream may be defined by a source node, a sink node and a path from the source node to the sink node. Within the viewpoint of the edge node 120 of FIG. 7, that path corresponds to a transmission from one input port 412 to one output port 414. A given data stream may support many connections. When a new connection request arrives at an input port 412, the connection is associated with a data stream. Therefore, with the arrival of a new connection request, an increment in the bitrate allocated to the associated data stream is required. Hereinafter, one or more connection requests and a bitrate allocation increase request are used interchangeably.

In overview, a data stream, or a connection within a data stream, directed to a given destination arrives at a universal edge node 120. It may then be the task of the universal edge node 120 to establish a connection to a given edge node towards the destination of the data stream. At the input-port controller 540 associated with the input port 412 at which the data stream arrives, a connection type is determined for the data stream and the data stream is buffered. Through communication between the input-port controller 540 and the edge node controller 580, a required bitrate is estimated for the connection to be established. Based on this estimated bitrate and the destination, a route (usually through a core network) to the given edge node is selected and a path for the data stream is set up on that route, with appropriate resources reserved along that path. To facilitate switching of many different types of data streams within the universal edge node 120, the data stream may be segmented into equally-sized data segments. To mitigate output contention for this output port 414, and other output ports 414, a data-transfer schedule is determined by the edge node controller 580, more specifically, by the fabric scheduling device 1140, which specifies a time index at which each input port 412 may communicate data segments to specific output ports 414.

It is important to note the universality of the universal edge node 120 from the standpoint of the many different connection types that may be handled. Connectionless data streams are expected to be the most straightforwardly handled. Exemplary connectionless data streams employ the well-known Internet Protocol (IP). Data segments of a connectionless data stream are sent on links comprising a route from source to destination on a best-effort basis. The rest of the connection types discussed herein involve end-to-end signaling to set up a path to the destination to be followed by the data stream. The "connection request", in response to which a path will be set up, specifies a requested bitrate. The bitrate request may be explicit, implicit or deduced from traffic observation. Once the path is set up, the path will have a capacity allocation equivalent to this requested bitrate, if that capacity allocation is available.

One routing protocol, that provides for end-to-end signaling to allow the determination of a path for a Protocol Data Unit (PDU, a generic name for a packet or cell) to take through a network, is called Multi-Protocol Label Switching (MPLS). MPLS is a technology for managing network traffic flow. One or more routes between a given edge node and a destination edge node may be predetermined at the source node. To set up a path, a route is selected. The given edge node communicates with each of the nodes along the selected route to reserve capacity to the next node in the route. Each node in the selected route associates a label with a mapping of output to the next node in the selected route. By including, at the given edge node, the label in each PDU sent to the destination node, processing time is saved at each node that would be otherwise needed for the node to determine the address of the next node to which to forward a PDU. The path set up in this way is called a Label Switched Path (LSP). MPLS is called multi-protocol because it may be used in conjunction with the Internet Protocol (IP), the Asynchronous Transport Mode (ATM) and the frame relay network protocol.

Alternate network protocols exist wherein, through appropriate communication from an edge node, a path with a capacity to carry a requested bitrate may be set up. See, for instance, the applicant's European Patent Application EP 0 980 168 A2, published Feb. 16, 2000 (hereby incorporated herein by reference), which describes a Universal Transfer Mode (UTM) of transferring payload data packets at a regulated bitrate. UTM may also be referred to as the Universal Internet Protocol (UIP).

Each input-port controller 540 of the universal edge node 120 includes a capability for high-capacity address translation (at the destination identifier 812), a capability to regulate bitrate (at the segment dequeueing circuit 822) and a capability to control bitrate increment (at the bitrate increment hysteresis controller 844). The universal edge node 120 is intended to accommodate traffic of different types, including: connection-based traffic with capacity reservation; connection-based traffic without capacity reservation; connectionless traffic with provisional connections; conventional connectionless ("best-effort") traffic; non-Internet Protocol traffic using the MPLS or UIP protocols; and traffic structured in other forms. The use of provisional connections will be described below.

In a first broad type of connection, a bitrate is explicitly specified, as the data stream arrives at the universal edge node 120, as a requirement of a connection. Exemplary connections of this first type employ the Asynchronous Transfer Mode (ATM) protocol or the UTM protocol and may, for instance, require a path with a capacity allocation of 40 Mbit/s.

In a second type of connection, a bitrate is not explicitly specified but, instead, various parameters describing the data stream are provided. Such parameters may included a mean bitrate, a peak bitrate and a dispersion or standard deviation of the bitrate. From the parameters provided by a data stream of this type, an effective bitrate may be estimated and used by the universal edge node 120 in the request for the set up of a path. For example, a connection of this second type may specify a mean bitrate of 10 Mbit/s, a peak bitrate of 100 Mbit/s, and a burstiness coefficient. Based on this information, the effective bitrate may be estimated as 16 Mbit/s, for example. A path would then be requested having a capacity allocation of 16 Mbit/s. Several methods for computing the effective bitrate are known in the art.

In a third type of connection, no bitrate is explicitly stated, nor are parameters describing the data stream provided. Instead, the universal edge node 120 essentially has permission to monitor the data stream and estimate a bitrate accordingly. The capacity allocation of a path for this third type of connection may be altered over time, through the use of end-to-end signaling, responsive to the occupancy of a data queue within the input buffer 818 that is associated with the output port 414 of the data stream and according to a hysteresis-control process.

The transfer of data may be preferably performed under the control of the UIP or a similar protocol. According to the UIP, each data stream is treated as a connection and the bitrate requirement for each connection may be estimated either by the traffic source or by the edge node supporting the traffic source. For connections of the above-introduced third type, bitrate allocation is preferably based on real-time traffic observation and may, therefore, be modified during a connection time. The traffic received at a given input port 412 may comprise numerous data streams, each defined according to destinations and other attributes. The bitrate for an individual data stream is naturally more volatile than the combined bitrate for all the data streams of an input port 412.

Figure 12:
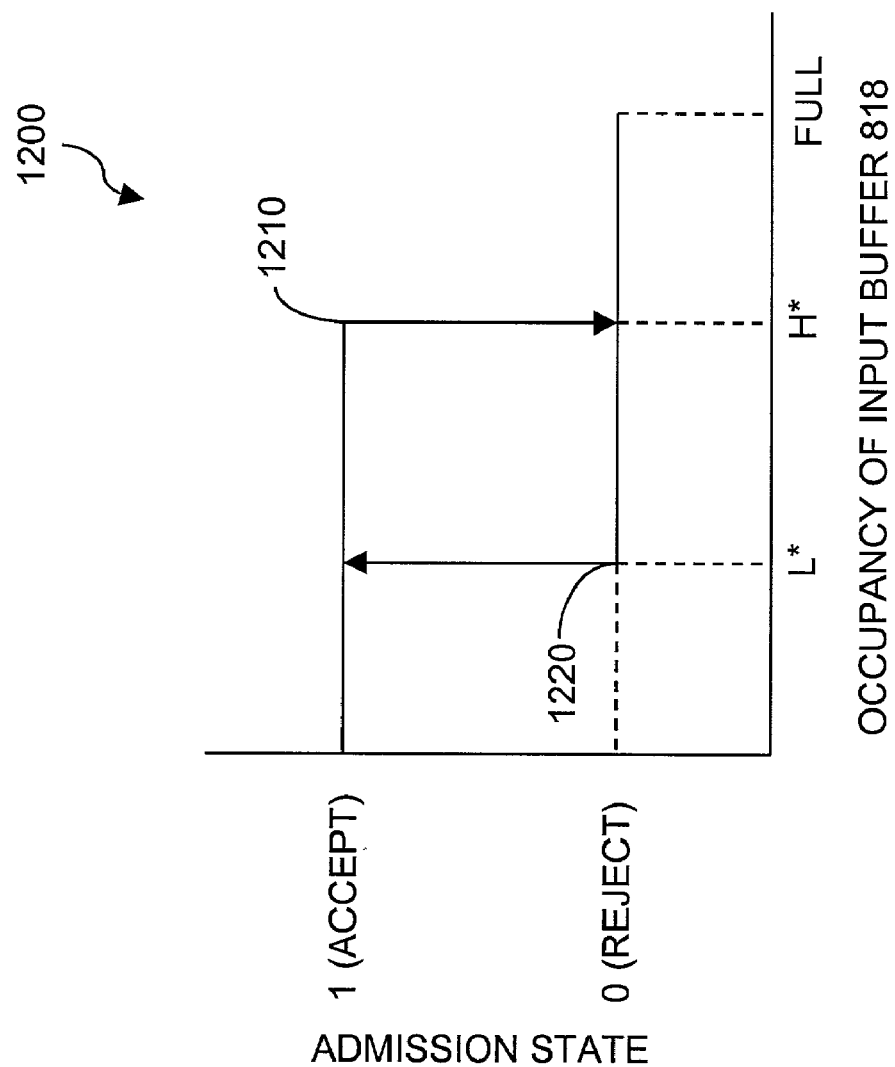
FIG. 12 illustrates admission-control thresholds according to an embodiment of the present invention.

To avoid data loss or excessive delay at an input port 412, requests, from traffic sources, for new connections should only be permitted to be sent to the edge node control processor 1150 when the total occupancy of the input buffer 818 is below a threshold that assumes one of two values, L* and H* as indicated in FIG. 12. A plot 1200 is illustrated in FIG. 12 for an on/off hysteresis-control process carried out by the on/off hysteresis controller 842. The plot 1200 depicts two admission states labeled "0" and "1". When the admission state is "0", a request for a new connection for a data stream is rejected. When the admission state is "1", a request for a new connection for a data stream is further processed to determine its acceptance or otherwise based on available capacity and other criteria.

In order to avoid a high rate of state change between states 0 and 1, which high rate may increase a processing load, the transition from state 1 to state 0 is arranged to occur when the overall occupancy of the input buffer 818 equals or exceeds an upper bound H* and the transition from state 0 to state 1 is allowed only when the overall occupancy of the input buffer 818 drops below a lower bound L*<H*. While a small bound difference (H*–L*) may unjustifiably increase the processing load, a large bound difference may reduce the processing load but may result in unnecessary rejection of bitrate allocation increase requests. A reasonable value of (H*–L*) may be determined based on the outer capacity of the source port 412S (i.e., the highest bitrate at which the source port 412S may receive data), the available capacity of the input buffer 818, a selected acceptable time interval between successive state changes and an estimated fluctuation pattern of output-port load relative to the value considered at the admission decisions.

Segmentation of variable-size packets requires null padding of incomplete segments. The null-padding is removed at the output ports of the edge nodes. Thus, the data rate at input ports and at output ports corresponds to the requested bitrate allocations. Internal to the universal edge node 120, however, the data rate may be increased due to null padding, and the increment by which the data rate may be increased is dependent of the packet-length distribution and, hence, can not be precisely determined. A slight internal expansion, as will be described below with reference to FIG. 16, can offset the effect of this artificially-increased data rate. (The expansion also facilitates the data scheduling process as will be described below.) The on-off hysteresis-control mechanism, described with reference to FIG. 12, prevents potential data loss at source ports by controlling the admission of new connection requests according to the total occupancy of source-port data buffers.

Restated, admission of a particular connection, i.e., whether the source port 412S will receive the particular connection, is shown to be dependent upon the occupancy of the input buffer 818. Initially, the admission control is in a "conditionally accept" state (state 1) wherein a request for a connection is conditionally accepted. When the occupancy of the input buffer 818 exceeds an upper limit, H*, the state of admission will change from state 1 (accept) to state 0 (reject) (transition point 1210). While admission control is in this reject state, any request for a new connection or increased bitrate-allocation for a connection in progress will be rejected. That is, the universal edge node 120 will respond to the source of the data stream indicating non-admission of the data stream. This state of rejection (state 0) will remain associated with the input buffer 818 until the input buffer occupancy decreases to less than a lower limit, L*, at which point (transition point 1220), the admission state is returned to conditionally accept (state 1).

Figure 13:
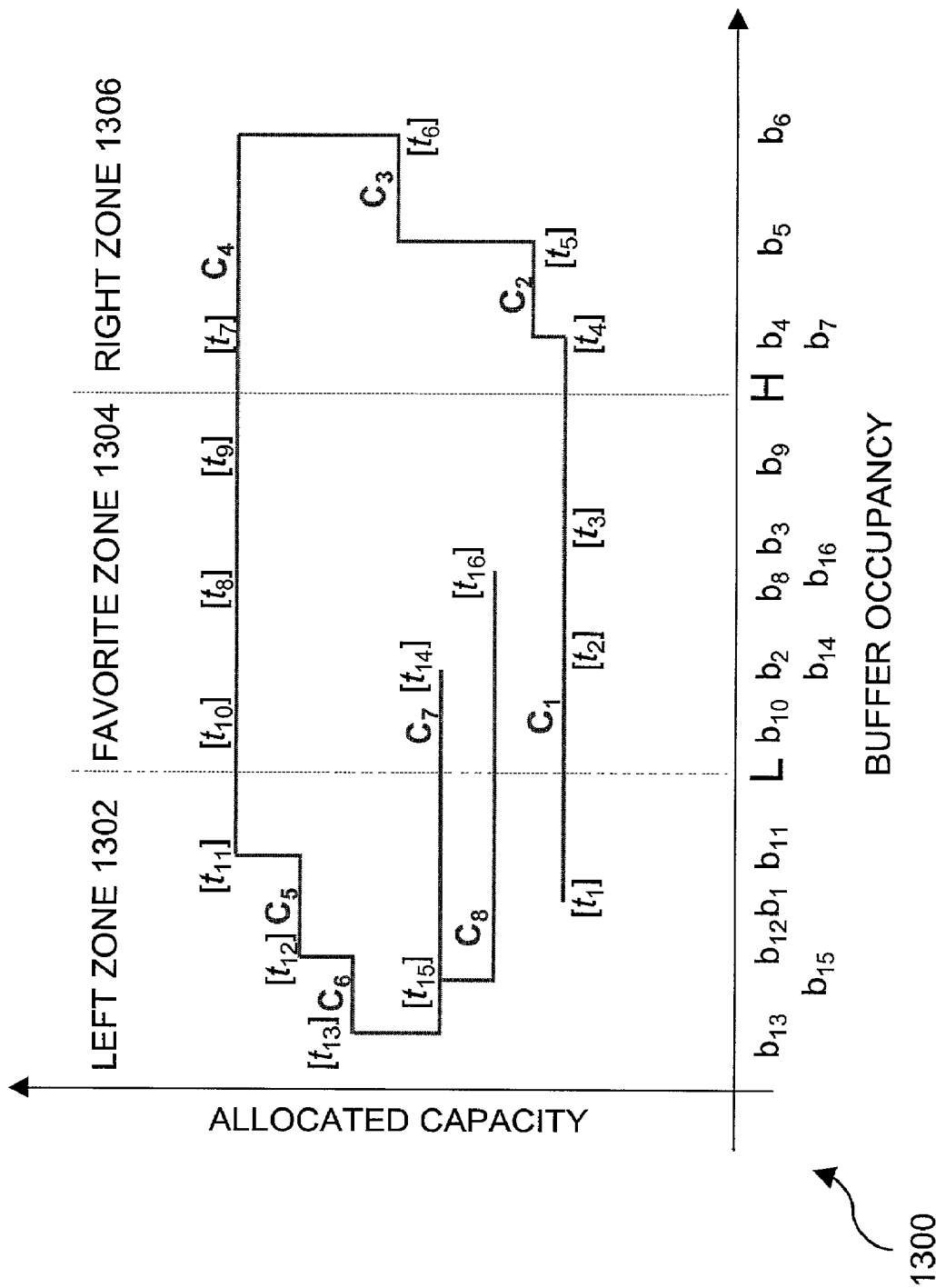
FIG. 13 illustrates exemplary changes in capacity allocation of a path based on the occupancy of a corresponding packet buffer.

As stated hereinbefore, a hysteresis-control process may be used to modify the capacity allocation of a path based on observing the occupancy of the data queue 1020 corresponding to the output port 414 associated with the path. FIG. 13 illustrates a plot 1300 informative of changes made to the capacity allocation of a path as a result of this hysteresis-control process, where the changes are based on the occupancy of the data queue 1020 corresponding to the output port 414 associated with the path. Note that the hysteresis-control process of FIG. 12 is based on the total occupancy of an input buffer 818. The hysteresis-control process requires that an upper bound and a lower bound for the number of waiting data segments in a data queue 1020 be defined. If the number of waiting data segments, i.e., the data queue occupancy of a data queue 1020, is less than (or equal to) the lower bound, the data queue 1020 is defined to be in a left zone 1302. If the occupancy is higher than (or equal to) the upper bound, the data queue 1020 is defined to be in a right zone 1306. Otherwise, the data queue 1020 is defined to be in a favorite zone 1304.

Restated, the plot 1300 illustrates changes in the capacity allocation of a path as a function of the occupancy of an associated data queue 1020. There are three zones. The left zone 1302 corresponds to a data queue occupancy below a predefined lower bound L, indicating a potential excess capacity allocation. The favorite zone 1304 corresponds to a data queue occupancy between the lower bound L and an upper bound H. The right zone 1306 is a critical zone that corresponds to a data queue occupancy exceeding the upper bound H. It is noted that the plot 1300 is used for illustration only. In actual operation, data related to only two successive points on the plot need be retained.

The plot 1300 may be created by recording the data queue occupancy and allotted capacity at 16 consecutive instants in time, labeled $t_1$ to $t_{16}$. The buffer occupancies are denoted $b_1$ to $b_{16}$ where buffer occupancy $b_j$ corresponds to an observation at time $t_j$. Capacity (bitrate allocation) increments $C_1$ to $C_2$, $C_2$ to $C_3$, and $C_3$ to $C_4$ are requested (by the bitrate increment hysteresis controller 844) at instants $t_4$, $t_5$, and $t_6$. In this example, each bitrate allocation increase request is presumed to have been granted. A bitrate allocation increase request is illustrated to have been granted at $t_4$, where the request was triggered by a transition from the favorite zone 1304 to the right zone 1306. The bitrate allocation increase requests that are illustrated to have been granted at both $t_5$ and $t_6$ may be considered to have been triggered by data queue occupancy increases within the right zone 1306. Changes in data queue occupancy, observed at instants $t_7$ to $t_{10}$, did not trigger requests for bitrate allocation changes. The bitrate allocation $C_4$ remains unchanged at observations $t_7$, $t_8$, $t_9$ and $t_{10}$. In this example, $b_{10}<b_8<b_9<b_7$. The transition from $b_{10}$ to the lower value $b_{11}$ crosses the lower-bound L and triggers a bitrate allocation decrease request which, when effected, leads to a capacity allocation decrement from $C_4$ to $C_5$. The decrements from $C_5$ to $C_6$, from $C_6$ to $C_7$, and from $C_7$ to $C_8$, are triggered by decreases in data queue occupancy within the left zone 1302.

It is noted that when the data queue occupancy is zero for a given data stream or an individual connection, the bitrate allocation for the data stream or individual connection may be reduced in small steps at consecutive time intervals until a non-zero data queue occupancy is observed.

Figure 14:
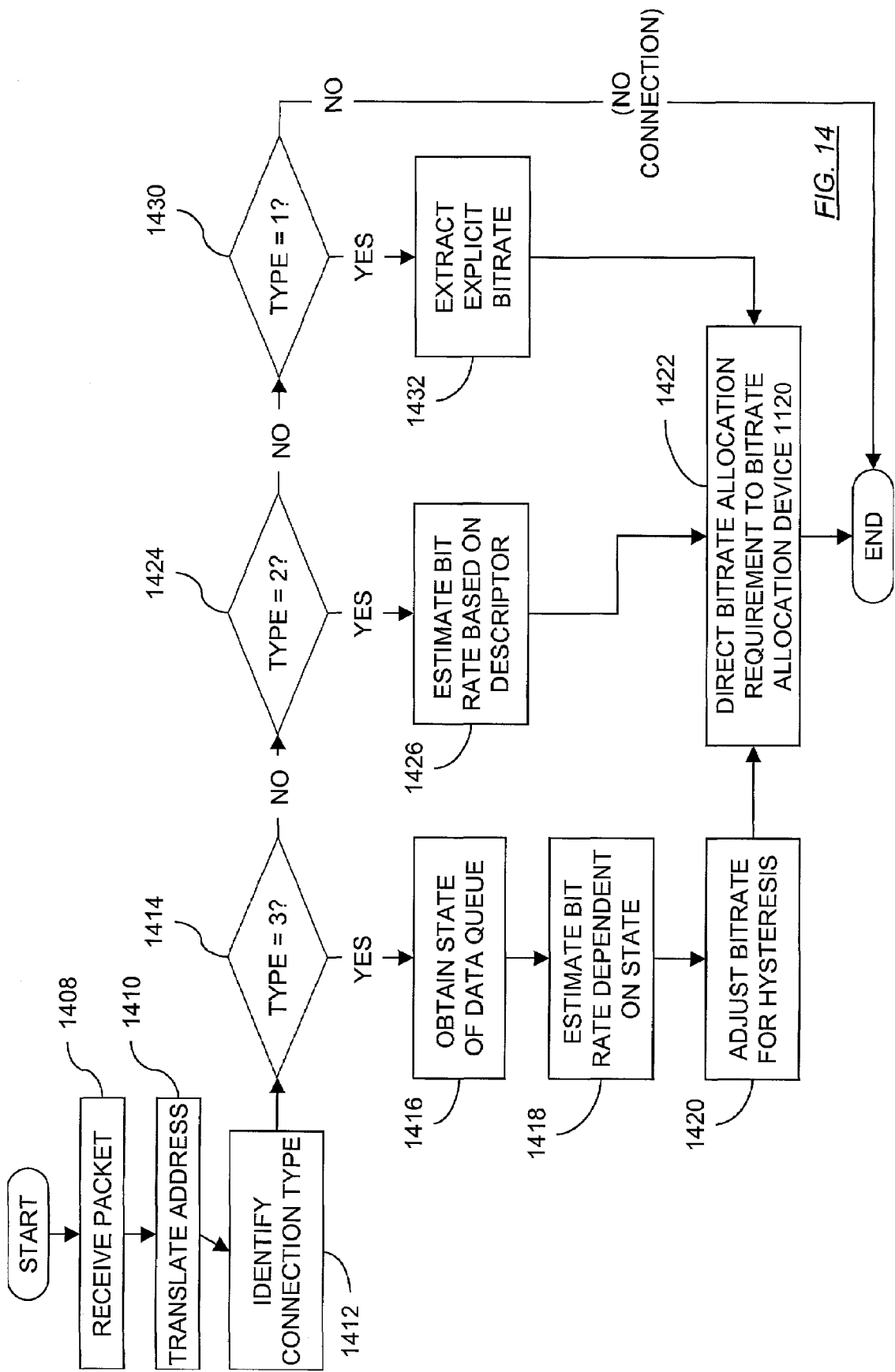
FIG. 14 illustrates steps in a method for determining a bitrate allocation requirement according to an embodiment of the present invention.

FIG. 14 illustrates the main steps for determining the required bitrate for a connection or a path. Preferably, a path is established for each data stream. Once a data packet is received (step 1408) at the data receiver 810, the address of the packet is determined (step 1410) and the connection type of the packet is identified (step 1412) by the destination identifier 812. Even beyond type of connection, it is necessary to determine a type of packet when sending the packet to the input buffer 818. If the packet is determined to be a data packet, then the packet belongs to a connection in progress and the packet is directed to a corresponding data queue 1020, perhaps based on the output port 414 to which the packet is to be sent. If the packet is determined to be a control packet, the packet is directed to a corresponding control-data queue 1010. Where the control packet includes a bitrate allocation decrement request, the request is accepted and processed accordingly. If the control packet includes a bitrate allocation increment request or a request to establish a new connection, the control packet is processed only if the input port is in state 1, as described above with reference to FIG. 12. Acceptance of a bitrate allocation increment request associated with a connection in progress is based on capacity availability on the existing path. A request to establish a new connection is processed according to connection type.

FIG. 14 depicts processing according to four connection types. If the connection type is determined (step 1414) to be the third type where the required bitrate is to be deduced from data stream monitoring (see above), a state-dependent bitrate allocation is required. A default value is initially allocated for a path then the data queue 1020 corresponding to the data stream, of which the packet is a part, is monitored to assess the need for an increment or the availability of a decrement. This assessment of need or availability is based on observing of the state (occupancy) of the corresponding data queue 1020 (step 1416), estimating a bitrate based on the observed state (step 1418) and adjustment of the estimated bitrate to provide hysteresis-control (step 1420) as described with reference to FIG. 13. The estimated bitrate allocation requirement is then directed (step 1422) to the bitrate allocation device 1120 (FIG. 11). The bitrate allocation device 1120 accepts or rejects the request to establish a new connection, which is associated with the estimated bitrate allocation requirement, based on availability.

A detailed description of methods and apparatus for hysteresis-control (step 1420) is given in Applicant's U.S. patent application Ser. No. 09/132,465, titled "Universal Transfer Method and Network with distributed Switch".

If the connection type is determined to be the second type where the required bitrate is determined from parameters characterizing the data stream (step 1424), the control packet includes traffic descriptors. These traffic descriptors are used when estimating a bitrate allocation requirement (step 1426). The estimated bitrate allocation requirement is then directed (step 1422) to the bitrate allocation device 1120.

If the connection type is determined to be the first type where the required bitrate is specified (step 1430), an explicit bitrate allocation requirement is extracted from the control packet (step 1432) and directed (step 1422) to the bitrate allocation device 1120.

A data stream may also include connectionless data, for which a provisional connection may be established. A provisional connection can be established for connectionless data for two purposes. The first purpose is to speed up the transfer of packets at intermediate nodes and therefore increase the network throughput. The second purpose is to enable the edge-node controller 580 to provide quality-of-service when the network load conditions permit. A detailed description of provisional connections is given in Applicant's U.S. patent application Ser. No. 09/132,465, titled "Universal Transfer Method and Network with distributed Switch".

When a bitrate allocation for a provisional connection is granted and successfully scheduled, the committed capacity on each link in the respective path is increased accordingly. The committed capacity is the sum of bitrate allocations granted to connections in progress. When a connection is released, or its bitrate-allocation is decreased, the committed capacity in each link traversed by the connection is adjusted accordingly.

A provisional connection uses the uncommitted capacity of the path of the data stream or the idle periods of the rate-regulated connections. However, the capacity granted may be revoked, or reduced, if capacity is required to accommodate a new connection, or to increase the bitrate allocation of an existing connection. A provisional connection is a privilege not a right.

When there are several unregulated connections within a path, all having the same origin and destination, the connections may be treated differently according to preferential service quality requirements, with each unregulated connection having its own service-quality index. This may be accomplished using any of weighted queuing mechanisms known in the art.

Once a data stream is admitted by a given input port 412 of the universal edge node 120, the input-port controller 540 of the given input port 412 informs the route selection device 1130 of the edge node controller 580 of the destination of the data stream. It is then the task of the route selection device 1130 to select a route to a destination edge node for the data stream. The route-selection may be based on the courteous-routing method described in Applicants U.S. patent application filed on Aug. 1, 2000, Ser. No. 09/630,190, the specification of which is incorporated herein by reference. This selected route may then be communicated by the edge node controller 580 to the input-port controller 540. Periodically, the route selection device 1130 may download route-sets from a network controller (not shown). The function of such a network controller, i.e., the monitoring of the state of links and nodes within the network and computation of routes from each edge node to each other edge node, may be performed at a single device, perhaps associated with a core node, or may be distributed throughout a network.

Where a data stream has been admitted and a route has been selected for the data stream, the data stream is then switched through the switching fabric 520. Dependent upon the type of switch used for the switching fabric 520, the data stream may have to be segmented into data segments of equal sizes. Segmenting of data streams in the input-port controller 540 is performed by the data formatter 820. When such segmenting is performed, it is inevitable that the last of a set of data segments representative of a variable size packet will have some null padding to fill the part of the data segment that does not correspond to data from the packet. After switching through the switching fabric 520, the data segments are received by the output port controller 550 and may be placed in the output buffer 918 in output queues 1030 according to the input port at which the segments originate. It is then a task of the output port controller 550 to reassemble the original packet from the data segments and send the packet on the path having the selected route through the network. See U.S. patent application Ser. No. 09/244,824, filed on Feb. 4, 1999, and titled "Rate-Controlled Multi-Class High-Capacity Packet Switch", (the specification of which is incorporated herein by reference) for a reference permitting the assembly of variable-size packets from non-consecutive data segments.

So that optimum use may be made of the switching fabric 520 of the universal edge node 120, the fabric scheduling device 1140 is provided as part of the edge node controller 580. The fabric scheduling device 1140, given the bitrate allocated to the various data streams present at the input ports 412, develops a schedule for the operation of the switching fabric 520, specifically indicating the time slots at which data segments are to be transferred from the input ports 412 to the output ports 414.

Scheduling basically translates bitrate allocations into a time table for transferring data segments from input ports to output ports.

The switching fabric 520 can be a common memory switching fabric, a space switch, or a rotator-based switch. A common memory switch has limited scalability and may be used only if it is determined that the capacity limit of the common memory switch is appropriate for a given network. A space switch with input buffers provides better scalability and has been extensively studied in the prior art. The scalability of a space switch is limited by two factors. The first limiting factor, and the more severe of the two, is the difficulty of scheduling, which is traditionally based on arbitration among the input ports 412 vying for the same output ports 414. The second limiting factor is the quadratic fabric complexity of the space switch. A scheduling method is provided herein for reducing the first factor limiting scalability of a space switch.

Figure 15A:
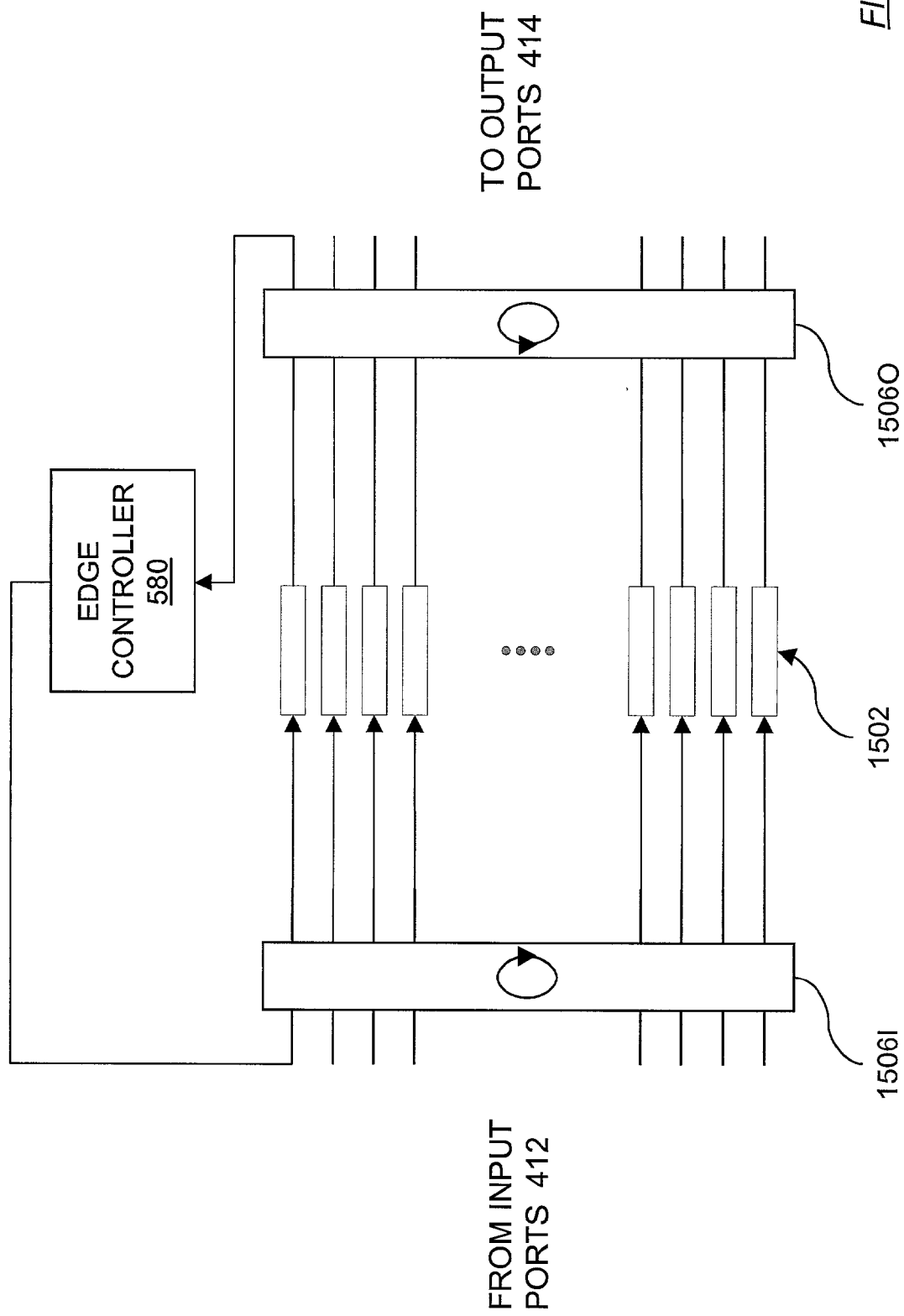
FIG. 15A illustrates a rotator-based high-capacity switching fabric, for use with an embodiment of the present invention.
Figure 15B:
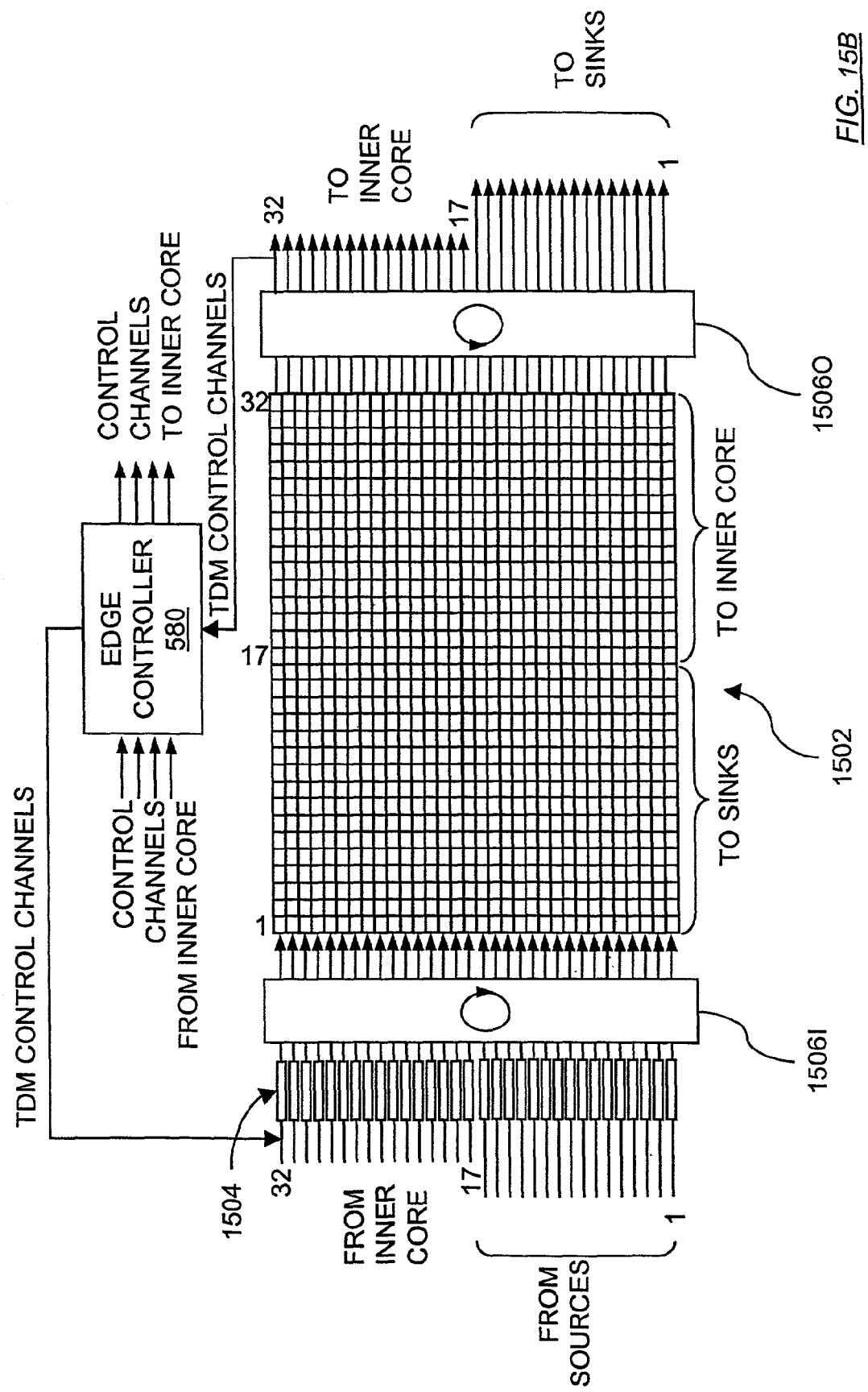
FIG. 15B illustrates an alternative representation of the rotator-based high-capacity switching fabric of FIG. 15A.

The preferred implementation of the switching fabric 520, however, is a rotator-based switch. A rotator-based switch, to be described below with reference to FIG. 15A, is scalable to very high capacities, of the order of tens of terabits per second with a very high number of ports, of the order of 10,000, for example. The main advantage of a rotator-based switch is a temporal disengagement property, which replaces complex arbitration with a matching process that includes a simple look-up and comparison process. The rotator-based switching fabric has been described in U.S. Pat. No. 5,168,492, issued on Dec. 1, 1992 to Beshai et al., U.S. Pat. No. 5,745,486, issued on Apr. 28, 1998, to Beshai et al., and U.S. Pat. No. 6,307,852, issued on Oct. 23, 2001, to Fisher et al. An extension to handle variable-size packets is described in U.S. patent application Ser. No. 09/244,824, filed on Feb. 4, 1999, and titled "Rate-Controlled Multi-Class High-Capacity Packet Switch". The rotator-based switch described in the above documents is devised for homogeneous ports, where each input port sends standard sized data segments and each output port processes the standard sized data segments to form variable size packets. Means are provided in U.S. patent application Ser. No. 09/244,824 to permit the assembly of variable-size packets from non-consecutive data segments. FIGS. 15A and 15B illustrate a rotator-based switching fabric that supports data streams of multiple granularity.

Briefly, a rotator-based switch operates by storing data for a deterministic period of time in an array of shared middle memories, as explained in the above-mentioned US patents. The ingress ports write data from ingress buffers to one or more sections in the middle memory, as dictated by the edge controller. During each cycle of the output rotator, the respective output ports read data segments from selected memory sections of the shared middle memories, as dictated by logical locations of those areas in the middle memories. In the example shown in FIGS. 15A and 15B, the shared middle memories are logically partitioned into two memory-block sections, and the links are divided into two groups. If a path comprises a single channel, an input port, under instructions from the edge-node controller, can forward data segments to the path during any memory access interval to memory sections allocated to that particular channel. With respect to a TDM path consisting of switched time slots during which a data segment is transferred, an input port, under instructions from the edge-node controller, can forward data segments to the path during any memory access interval. However, the number of data segments that can be forwarded in a rotator cycle is limited by the capacity allocated to the path, as determined by an admission controller (not illustrated).

To facilitate the transfer of data segments to the shared middle memories, the access intervals of a path are not pre-assigned by the admission controller. Instead, the data segments allocated for each frame are transferred during any access interval, subject to the availability of a corresponding free memory section. The timeslots for each path are, however, assigned by a corresponding core-node controller (not illustrated). In order to enable a de-coupling of the timeslot allocations within the core node and the source node, timeslot interchange circuits, well understood in the art, are provided at corresponding output ports 414. The timeslot interchange circuits facilitate connection co-ordination at the edge because of this de-coupling. The timeslot interchange circuits accept a data segment during any time slot, and forward that data segment during another timeslot, using a connection table that dictates the timeslot position of the data segment forwarded to the corresponding core node. For simplicity of operation, the cycle of the timeslot interchanger is selected to equal the rotator cycle.

The edge node of FIGS. 15A and 15B is basically a combination of a source node and a sink node. The source ports support links connected to data traffic sources, and receiving ports receive data from respective core nodes. Each input port includes an input alignment buffer 1504 required for potential delay in accessing the addressed memory sections in middle memories 1502. An input rotator 1506I connects the input ports to the shared middle memories 1502. An output rotator 1506O connects the shared middle memories 1502 to the output ports.

Scheduling the switching of data segments across a switching fabric can be an intricate function that limits the capacity of the edge node. The computational effort to schedule the switching of data segments across a switching fabric can be extensive. As such, the speed of schedule computation may be lower than the data-transfer speed. This can be overcome by two measures. The first measure is called "Parallel Exclusive Scheduling". The second measure is called "Replicate Schedule Use". The two measures are incorporated in the scheduling method described below. They can be used individually or collectively.

The traffic from any input port 412 to any output port 414 is represented by an integer number of time slots in the scheduling frame. Thus, there is the potential of round-up waste, the highest value of which equals the number of output ports. The term "maximum relative capacity waste" may be defined to describe the situation wherein the scheduling frame schedules packets from an input port 412 destined primarily for one sink node and the time slots assigned to the rest of the sink nodes are significantly underutilized. The maximum relative capacity waste for this scheme is $(N-1)/(S \times L)$, where N is the number of sink nodes, S is the number of time slots per frame, and L is the number of upstream channels. In general, the allocation requirement for each path, i.e., the required number of time slots per scheduling frame, is expressed as an integer number (possibly zero) of time slots, plus a fraction of a time slot. If the fraction is uniformly distributed between 0.0 and 1.0, the mean value of capacity waste would be half the maximum capacity waste.

Rather than scheduling data packets that are waiting in data queues 1020 in the input buffer 818, the fabric scheduling device 1140 produces schedules for anticipated data packets, where the anticipation is based on an adaptive bitrate estimate. A scheduling frame having a specified number of time slots is used. The number of time slots per scheduling frame per source node should substantially exceed the number of sink nodes. Thus, in a network having 1,024 edge nodes (each edge node including a source node and a sink node as described earlier), where each edge node is connected to a core node by a link having multiple channels, the number of time slots per scheduling frame should be high enough to contain the relative capacity waste below a reasonable bound. With 1,024 time slots per frame, 1,024 edge nodes and eight upstream links (or channel-bands), the mean relative capacity waste would be $1/16$ and the maximum relative capacity waste would be $1/8$.

The data rate at the output of electronic source nodes is limited by the capability of electronic circuitry to values that are significantly smaller than the capacity of an optical fiber link. Likewise, electronic sink nodes can receive distinct data streams at relatively lower rates than what an optical fiber link can deliver. Where packets are to be transferred from a source node to the agile optical core 230, the packets must be multiplexed into a wider spectrum and the data received from the agile optical core 230 must be demultiplexed into narrower spectra.

In one form of network structure and operation, both spectrum division and time division can be exercised at the edge nodes while only time division would be exercised at the bufferless agile core node 280. Time division is generally thought to be easier to manage than spectrum division. However, time division in a bufferless core node requires strict time coordination between the core node and the edge node 120. One such scheme is described in Applicant's U.S. patent application Ser. No. 09/960,959, filed on Sep. 25, 2001 and titled "Switched Channel-Band Network," the specification of which is incorporated herein by reference.

The universal edge node 120 is inherently fast switching and is provided with high-capacity input buffers 818. The agile core node 280, however, is bufferless and, hence, requires precise coordination with the source nodes in order to create time-slotted paths of fine granularities. A scheme based on effective time-sharing in an optical-core network requires that the edge nodes be time-locked to the core nodes, that all nodes be fast-switching and that a path between two edge nodes traverses a single optical core node. Direct connections among edge nodes 120 do not require time coordination, because the edge nodes 120 are equipped with input buffers and output buffers.

In order that the packet received from the universal edge node 120 at the agile core node 280 be switched to the appropriate edge node, precise timing is of paramount importance. This precise timing should be achieved while taking into account the effect of signal dispersion in the fiber links. To realize time-locking, each agile core node 280 has a master time-counter and each universal edge node 120 has at least one slave time-counter dedicated to each agile core node 280. All time-counters, at the universal edge nodes 120 and the agile core nodes 280, should have the same period and clock rate. The controller (not shown) of each agile core node 280 communicates with the sink nodes (recall that an edge node comprises a source node and a sink node) during at least one time slot per scheduling frame. This communication does not require the aforementioned time-locking procedure, due to the availability of buffers at the electronic sink node. In general, up-stream communication (from the source node to the core node) requires time-locking while downstream communication (from the core node to the sink node) does not require time-locking because of the availability of buffers at the sink nodes.

All output ports 414 require output buffers 918 for several reasons including (1) collating data segments of each packet, where data segments of a given packet received at an output port may be interposed by data segments of other packets, and (2) removal of null-padding, if any. A departure port 414C connecting to a static core node 180 requires no timing circuitry. A departure port 414C connecting to an agile core node 280 and switching entire channels and a departure port 414C connecting to an agile core node 280 and switching time-shared channels (using time division and spectrum division as mentioned above) requires time-coordination circuitry.

In the hybrid network 300 (FIG. 3), comprising universal edge nodes 120 interconnected by bufferless core nodes 180, 280, the transfer of data bursts from the source nodes to the sink nodes via the core nodes 280 requires precise time coordination to prevent contention at the bufferless core nodes 280. The above statement assumes that each universal each edge node 120 comprises a source node and a sink node, where the source node and the sink node share an edge node controller 580 and have data buffers 818, 918 and means for managing the data buffers 818, 918. The core nodes 280 preferably comprise a plurality of optical switches (not shown), each of which may switch entire channels or data blocks such as TDM data segments or data bursts. Note that core nodes 180 support fixed paths and are virtually static.

As described earlier, a first node X is said to be time-locked to a second node Y along a given channel, if, at any instant of time, the reading of a time-counter at the first node X equals the sum of a reading of a corresponding time-counter at the second node Y and the propagation time along the given channel from the first node X to the second node Y. This statement assumes that the propagation time is normalized to the time-counter period and that the time-counters at the first node X and the second node Y have the same time-counter period. There may be several channels connecting the first node X to the second node Y and a channel may be associated with an individual wavelength in a fiber link or several fiber links. Due to the difference in propagation delays of different channels connecting a source node of the first node X to a sink node of the second node Y, time-locking may be realized for the different channels individually. Due to dispersion, time-locking of individual channels may be required even for channels defined by wavelengths in the same fiber link. When the first node X is time-locked to the second node Y along a given channel, the given channel is said to be time-locked.

At a core node 280, in order to be able to switch data streams arriving from different universal edge nodes 120, where each data stream experience a different propagation delay to the core node 280, without contention or the need for data storage at the core node 280, the universal edge nodes 120 must be time-locked to each optical switch at a core node 280. A time-locking technique, also called time-coordination, is described in applicant's U.S. patent application Ser. No. 09/286,431, filed on Apr. 6, 1999, and titled "Self-Configuring Distributed Switch", the specification of which is incorporated herein by reference. With time-locking, the scheduling method in accordance with the present invention guarantees that data streams arrive to already free respective input-output ports of the optical switch.

As described above, for time-locking, each source node has at least one time-counter and each agile core node 280 has at least one time-counter. All time-counters have the same period and time-locking can be realized through an exchange of time-counter readings between each source node and its adjacent core node, i.e., the core node to which the source node is connected. The time-counter readings are carried in-band, alongside payload data destined to sink nodes, and each time-counter reading must be timed to arrive at a corresponding core node during a designated time interval. One difficulty of securing time-coordination arises from two interdependent requirements. The first requirement is that communicating a time-counter reading from a controller of a source node to a controller of a core node requires that the source node be time-locked to the core node. The second requirement is that time-locking a source node to a core node necessitates that a controller of the core node be able to receive a time-counter reading from the source node controller during a designated interval of time. To initiate or restore time-locking, a secondary mechanism is therefore required for directing upstream signals received from source nodes toward said edge controller, as described in Applicant's United States Patent Application filed Nov. 13, 2001 and titled "Time-Coordination In A Burst-Switching Network".

The scheduling computational time per data segment is expected to be negligibly small in a common-memory switch and quite large in a space switch that has a large number of ports and relies on real-time arbitration among uncoordinated input ports attempting to connect to output ports. When two or more input ports have data segments destined to the same output port, an arbiter grants connection permission to one of said input ports, and the others must wait. Real-time arbitration is unsuitable for transferring packetized data across a large-scale space switch.

A rotator-based switch eliminates the need for arbitration and real-time segment scheduling is expected to be feasible with data segments of moderate sizes, of 10,000 bits for example. With data segments of small size, 1,000 bits for example, the arbitration time per data segment in a space switch would be an order of magnitude higher than a segment transfer time. The processing time required to find matching time slots at respective input and output ports is hereinafter called "matching processing-time". A matching processing time per data segment in a rotator-based switch would be significantly less than a corresponding arbitration time in a space switch, but it may still be higher than a transfer time per data segment.

A unified scheduling technique, according to the present invention, may be applied to scheduling for both space switches and rotator-based switches. The switching fabric 520 of a rotator-based switch is, however, scalable to a much higher capacity than the switching fabric 520 of a space switch. The unified scheduling technique is described below with reference to FIGS. 17 to 22.

An input port 412 may provide a bitrate expansion where the capacity at the inner side (the switching fabric side) is higher than the capacity at the outer side (source side). For example, if the input port 412 supports data links of 10 Gb/s capacity, the source side of the input port need only have a capacity of 10 Gb/s. However, due to scheduling imperfection, the inner side may occasionally have to be idle due to contention for accessing a desired output port. Therefore, the inner capacity may be increased, for example to 12 Gb/s, to offset the idle-time effect.

FIG. 15A illustrates a prior art rotator-based switch having a plurality of input ports 412, a plurality of output ports 414, a plurality of middle memories 1502, an input rotator and an output rotator. An input port 412 connects to one of the middle memories 1502 during an access interval, of 0.1 microseconds for example. The number of middle memories 1502 preferably equals the number of input ports 412, so that during any access interval each input port has an opportunity to transfer a data segment. In a rotator cycle, each input port, through the input rotator, delivers data to each middle memory 1502. Likewise, through the output rotator, each output port can receive data from each middle memory 1502 during a rotator cycle. The time required for any input port to visit each middle memory 1502, i.e., the duration of a rotator cycle, equals the number of middle memories 1502 times the access time. If there are 8192 middle memories 1502, for example, and the access time of any input port is 0.1 microseconds, then the duration of the rotator cycle is about 820 microseconds. A scheduling frame, to be described below, preferably has a period equal to the duration of a rotator cycle. If it is desired, however, to have a scheduling frame of a larger number of time slots, the scheduling frame may be selected to be an integer multiple of the duration of the rotator cycle. An edge controller 580 is connected to the rotator-based switch as indicated in FIG. 15A.

A functional representation of the rotator-based switch of FIG. 15A is given in FIG. 15B, where the middle memories 1502 are shown to be logically divided into memory sections. Each row in the middle structure of FIG. 15B corresponds to a middle memory 1502.

Referring to FIG. 15B, each middle memory 1502 is logically divided into a number of sections, the number of sections being at least equal to the number of output ports, and each output port is associated with a designated section. During an access interval, an input port can write a number, J, of data segments to any section in a middle memory and an output port can read a number, K, of data segments from a middle memory. The J data segments can be destined to the same output port, or to as many as J output ports. During an access interval, an output port is allowed to read the content of only one section in the middle memory to which said output port is connected. Hence, each section in each middle memory must be able to hold at least K data segments. When a section in a middle memory is read by an output port, the section occupancy reduces to zero and, hence, the section becomes ready to receive new data segments.

An input port attempting to write data segments to a given output port may find the corresponding section fully occupied. The input port would then attempt to write data segments, destined to another output, in the middle memory. For each input port, there is a one-to-one correspondence between an access interval and accesses to a middle memory. During a subsequent access interval, the input port attempts to write data segments destined to said given output port in another middle memory.

Figure 16:
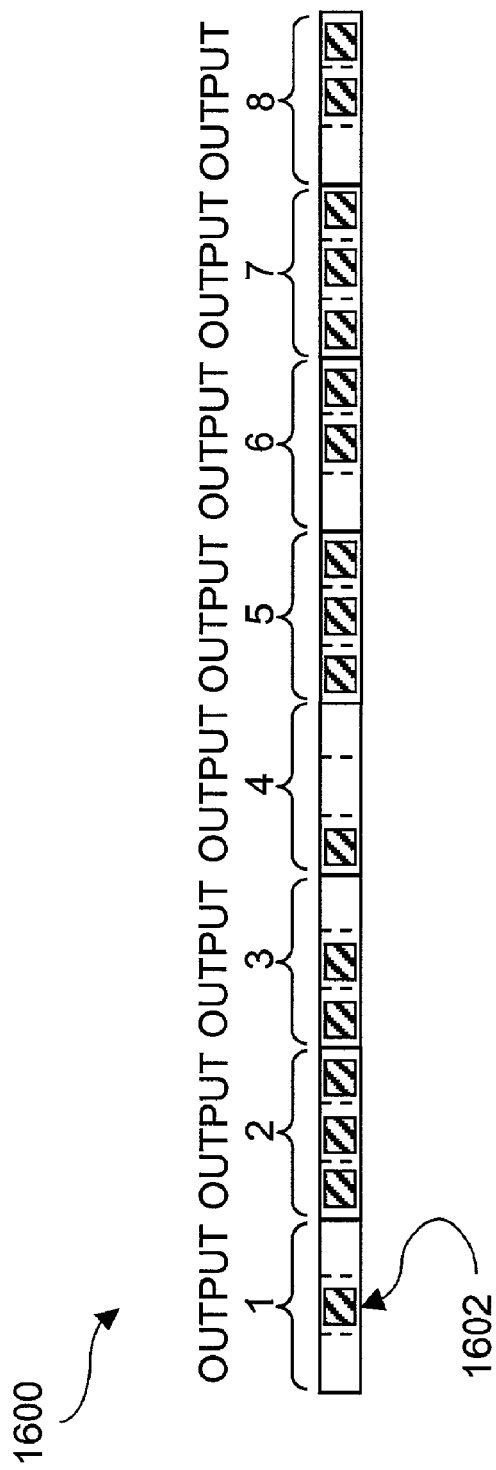
FIG. 16 illustrates the use of internal expansion in the rotator-based switching fabric of FIGS. 15A and 15B.

FIG. 16 illustrates the use of internal expansion in the rotator-based switching fabric of FIGS. 15A and 15B. This internal expansion is introduced to reduce contention, for individual memory locations 1602 within a middle-memory 1600, between input ports 412 for the same output port 414. An input port 412 is allowed to write up to two data segments per middle-memory access interval while an output port 414 is allowed to read up to three data segments per middle-memory access interval. More generally, input ports 412 may be allowed to write up to P data segments per middle-memory access interval while output ports 414 may be allowed to read up to Q data segments per middle-memory access interval, where P and Q are integers with Q>P.

Scheduling may be performed using a "direct matching process". In a direct matching process, connections for a set of input-output pairs are scheduled for each time slot in a particular scheduling frame. In general, a data segment waiting in an input buffer 818 at an input port 412 is assigned a time slot in which both the input port 412 and the output port 414, required by the data segment, are unoccupied (free). Direct matching requires that the state of the required output port 414 of the data segments waiting in the data queues 1020 in the input buffer 818 of each input port 412 be known by the fabric scheduling device 1140. As the data queues 1020 are arranged by output port, this information is easily available. The fabric scheduling device 1140 matches data segments with time slots in which the appropriate input port 412 and the appropriate output port 414 are both free. The direct matching process according to the present invention is performed as a series of scheduling windows. In each scheduling window, a prescribed maximum number of data segments is scheduled.

Figures 17A, 17B:
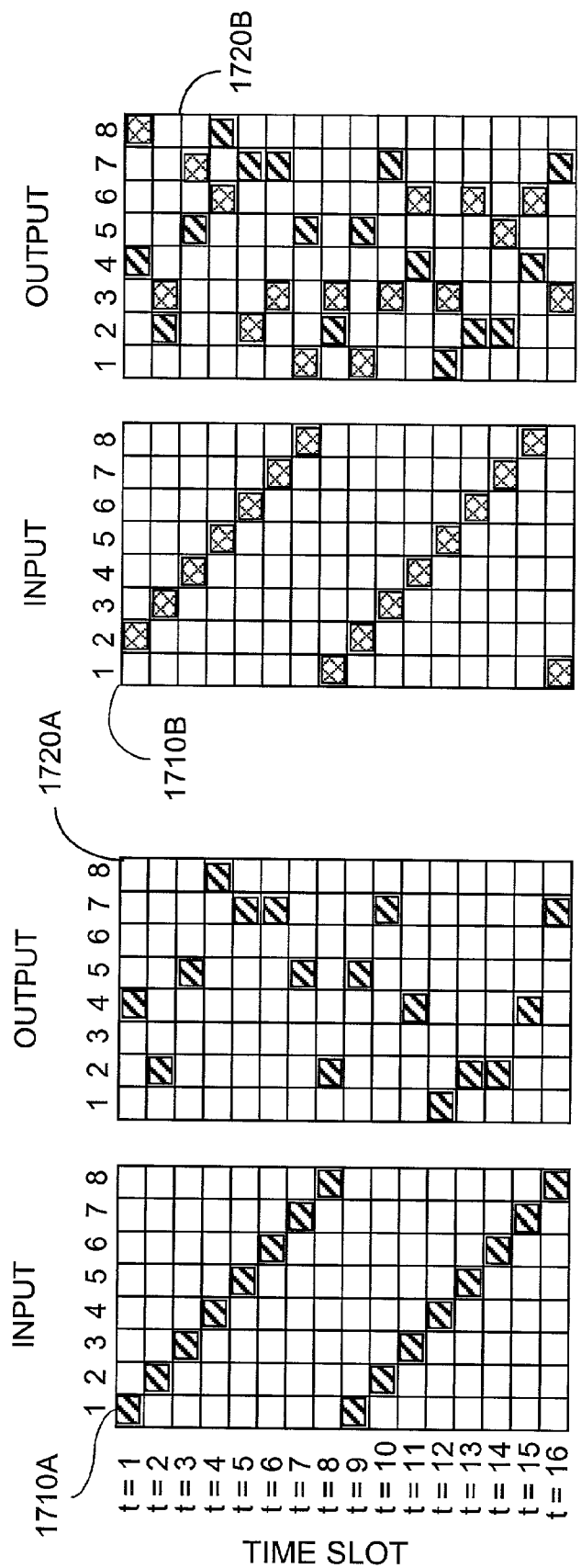
FIG. 17A illustrates state matrices indicating the free-busy state of input ports and output ports in a space-switch fabric after completion of a first step in a time-slotted sequential scheduling steps, for use in an embodiment of the present invention.
FIG. 17B illustrates the state matrices of FIG. 17A after completion of a second step, for use in an embodiment of the present invention.

FIG. 17A illustrates an input-state matrix 1710A and an output-state matrix 1720A to assist in the description of an exemplary direct matching process in a space switch. The input matrix 1710A indicates a state (either free or busy) of each input port at each time slot of a scheduling frame. The scheduling frame in this example has 16 time slots. The output-state matrix 1720A indicates a state of each output port at each time slot of the scheduling frame. The data in each row in matrix 1710A is held in a separate memory. Similarly, the data in each row in matrix 1720A is held in a separate memory. In its simplest form, there are 2×S memories in the fabric scheduling device 1140, where S is the number of time slots per scheduling frame, as will be described with reference to FIG. 26. For a given data segment, the input-output pair is predetermined. A time slot is then selected for the given data segment where both the appropriate input port 412 and the appropriate output port 414 are free. This can be done in steps using parallel matching, described hereinafter.

In a general implementation, the N input ports 412 are divided into input port groups, each group having a maximum of G input ports. The S time slots per scheduling frame are divided into time windows each of which time windows has a maximum of W time slots. For ease of implementation of parallel scheduling, it is preferable that the number of input-port groups be equal to the number of time slot groups. The number of input-port groups is determined as K=⌈N/G⌉, where ⌈r⌉ denoted the nearest higher integer to a real number r. The number of time windows is determined as J=⌈S/W⌉. A preferred parallel-scheduling process requires that ⌈N/G⌉=⌈S/W⌉. For example if N=980 input ports, S=2048 time slots, and W=16 time slots, then the number of time windows become 128, and the preferred maximum number of input ports per group is 8 input ports. This results in some of the input-port groups having less than 8 input ports. It is noted that he selection of the values of S and W is less constrained than the selection of the value of N. Hence, it is preferable to select both S and W to be powers of 2.

During a time slot in a time window, an input port can schedule the transfer of data segments to at most a prescribed number, q, of different output ports. This process does not require coordination with other input ports because each of the plurality of schedulers operate exclusively on a single time window.

In the rotator-based fabric, there is a direct correspondence between a time slot in a scheduling frame and the middle memory that a given input port accesses.

In parallel matching, each input port 412 is concerned with scheduling in a single time slot. Thus, all N/G input-port groups may perform scheduling at the same time. After the scheduling is complete, each input-port group is assigned a new time window during which the input-port group schedules the transfer of data segments to output ports. For instance, in view of FIG. 17A, input port 1 can schedule a data segment to be sent to output port 4 in time slot 1, because output port 4 is free in time slot 1. At the same time, input ports 2 through 8 may be scheduling data segments in time slots 2 through 8 to respective output ports. At the next scheduling opportunity, input port 1 may schedule a data segment in time slot 9 while, at the same time, input ports 2 through 8 may be scheduling data segments in time slots 10 through 16.

At the next scheduling opportunity, illustrated in FIG. 17B, input port 2 can schedule a data segment to be sent to output port 8 in time slot 1, because output port 8 is free in time slot 1. Note that if input port 2 has a data segment to send to output port 4, scheduling of that data segment will have to be delayed until input port 2 is scheduling in a time slot wherein output port 4 is free.

Where the matrices of FIG. 17A indicate input-output pairings after the first scheduling window, an input matrix 1710B and an output matrix 1720B of FIG. 17B indicate input-output pairings after the second scheduling opportunity, where a maximum number, q, of data segments scheduled per time slot per window is one.

Figures 18A, 18B:
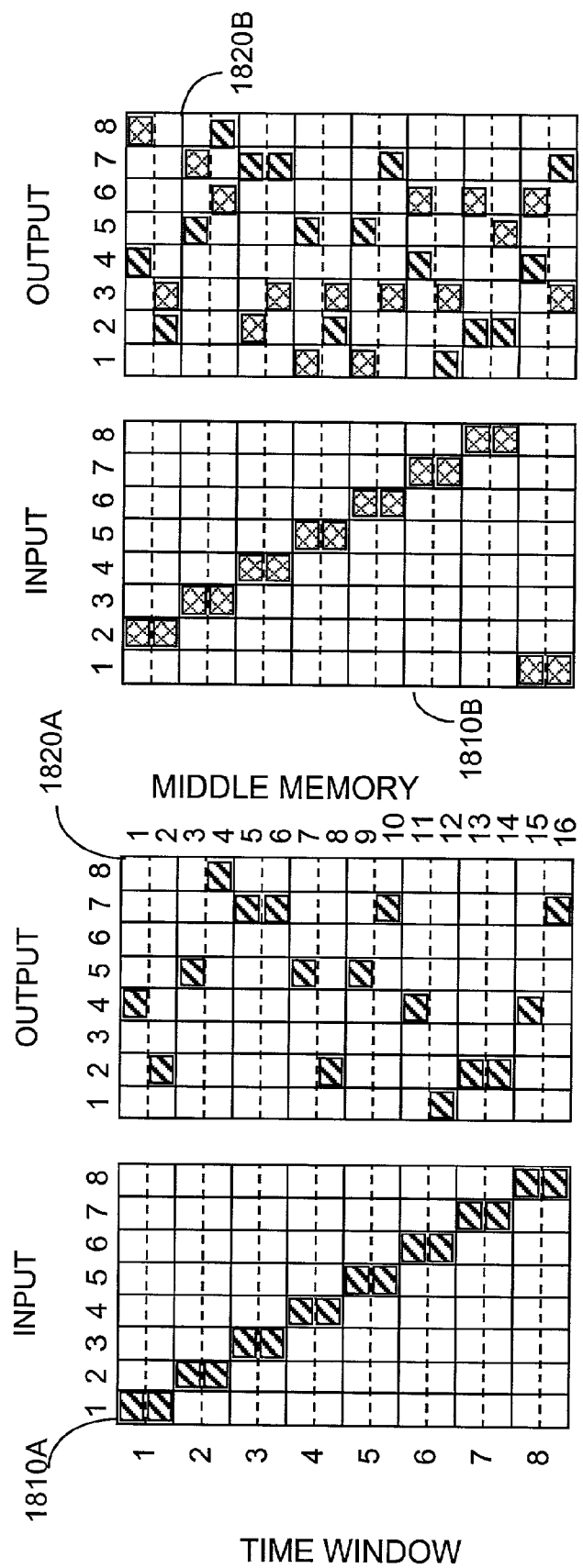
FIG. 18A illustrates matrices indicating the free-busy state of input ports and output ports in a rotator-based switching fabric after completion of a first step in a time-slotted sequential scheduling steps, for use in an embodiment of the present invention.
FIG. 18B illustrates state matrices of FIG. 18A after completion of a second step, for use in an embodiment of the present invention.

FIG. 18A depicts state matrices to assist in the description of a matching process in a rotator-based switch. The rows of an input state matrix 1810A correspond to specific middle memories. These middle memories are grouped into time windows so that an input port 412 can transfer data segments to more than one output port in a given middle-memory access interval. An output state matrix 1820A shows which output port 414 to receive a data segment from the corresponding input port 412 from the input state matrix 1810A. FIG. 18B shows an input state matrix 1810B and an output state matrix 1820B for a subsequent middle-memory access interval to that shown in FIG. 18A.

The basic difference between matching in a space switch and matching in a rotator-based switch is that the rotator-based switch provides a natural de-coupling of the input-output pairs during any given time window. This natural de-coupling means that when input port 1 accesses middle memory 8, for example, input port 2 accesses middle memory 9, and so on. Thus, at any given time, input ports 1 and 2 are scheduling in respect of different middle memories and a scheduling collision, wherein two or more input ports 412 attempt to access the same output port 414, is avoided.

A number of arrays are illustrated in FIGS. 19A to 19E. These arrays are used when scheduling use of time slots by the input ports 412. An input-state array 1902 may be seen to correspond to a column of the input state matrix 1710A of FIG. 17A. The input-state array 1902 may be used to describe the state of a particular input port 412 in each of a set of time slots. In this example, where an element of the input-state array 1902 is "0", the input port 412 is free in the time slot that corresponds to the index of that element. Conversely, where an element of the input-state array 1902 is "1", the corresponding input port 412 is busy in the time slot that corresponds to the index of that element. A bitrate demand array 1904 (generated by a bitrate demand matrix generator described hereinafter) may be used to indicate, for a given input port 412, how many data segments an input port 412 is allowed to transfer to an output port 414 during a scheduling frame. A bitrate demand array 1904 for each input port 412 may be assembled to form a bitrate demand matrix.

When scheduling for a given input port 412, the fabric scheduling device 1140 requires the information contained in the input-state array 1902 so that a scheduling attempt is not made for a time slot that is already occupied. In fact, actual data segments may not be waiting in the data queues 1020 but, instead, the bitrate demand array 1904 may represent the number of data segments that are required to be scheduled per scheduling frame, based on bitrate allocation.

A flat-structure demand array 1906 is illustrated as an alternate form of the bitrate demand array 1904. Rather than indicating a number of data segments waiting in a data queue 1020 corresponding to an output port 414, an identity of an output port 414 is used as an element of the flat-structure demand array 1906. The number of elements indicating a particular output port 414 matches the number of data segments per scheduling frame allocated to an input port and to be switched to the particular output port 414. As the flat-structure demand array 1906 conveys equivalent information to the bitrate demand array 1904, there are five elements indicating output port 2, two elements indicating output port 4, two elements indicating output port 5, one element indicating output port 7 and four elements indicating output port 8. If, when the fabric scheduling device 1140 is selecting data segments to schedule, the flat-structure demand array 1906 is read in the order that the elements are indexed, all of the data segments waiting in the data queue 1020 corresponding to output port 2 would be scheduled first, followed by the data segments waiting in the data queue 1020 corresponding to output port 4, and so on. To remedy this uneven distribution of scheduling opportunities, the elements in the flat-structure demand array 1906 may be scrambled to give a spread flat-structure demand array 1908. The scrambling method may be arbitrarily chosen. A suggested scrambling scheme is illustrated in a scrambling table 1910. To translate an old index number (in the flat-structure demand array 1906) to a new index number (in the spread flat-structure demand array 1908), a binary representation of the index number may be reversed in bit order. For instance, index number 1 (0001) becomes index number 8 (1000). Such a scrambling scheme may be implemented in hardware simply through the appropriate connection of addressing paths representative of the individual bits.

Parallel Exclusive Scheduling involves scheduling the transfer of data segments from the input ports 412 of the switching fabric 520 to the output ports 414. A scheduling frame is associated with each of the input ports 412, where the scheduling frame has a specified predetermined number of time slots and a predetermined duration that is equal for all input ports 412. Each input port 412 generates a demand (vector) array (see the bitrate demand array 1904, the flat-structure demand array 1906 and the spread flat-structure demand array 1908 of FIG. 19) indicating the required number of time slots per scheduling frame for each output port 414. Parallel Exclusive Scheduling specifically involves dividing the plurality of input ports 412 into input-port groups. For each input port, the duration of the scheduling frame is divided into time windows. Non-intersecting scheduling domains are then formed, where each of the scheduling domains is a representation of an association between one of the input-port groups and one of the time windows. A scheduling process is then concurrently executing for each of the non-intersecting scheduling domains. The scheduling process for a given scheduling domain determines a schedule that indicates a timing for a transfer of data segments to predetermined ones of the output ports 414 from the input ports 412. This schedule relates to the transfer of data segments from the input ports 412 of the given scheduling domain during the time window of the given scheduling domain. The forming of domains and concurrent scheduling is then repeated for all permutations of the input-port groups and time windows.

The schedule, as determined above for a single duration of the scheduling frame, may be used for a configuration period, where the duration of the configuration period is an integer multiple of the duration of the scheduling frame. This use of a schedule for more than one scheduling frame duration is the above-mentioned Replicate Schedule Use.

The time taken to perform each scheduling process may be limited to an "execution time period". Additionally, each time the scheduling process is performed, this execution time period may be set differently, to accommodate changing traffic patterns.

Figure 20:
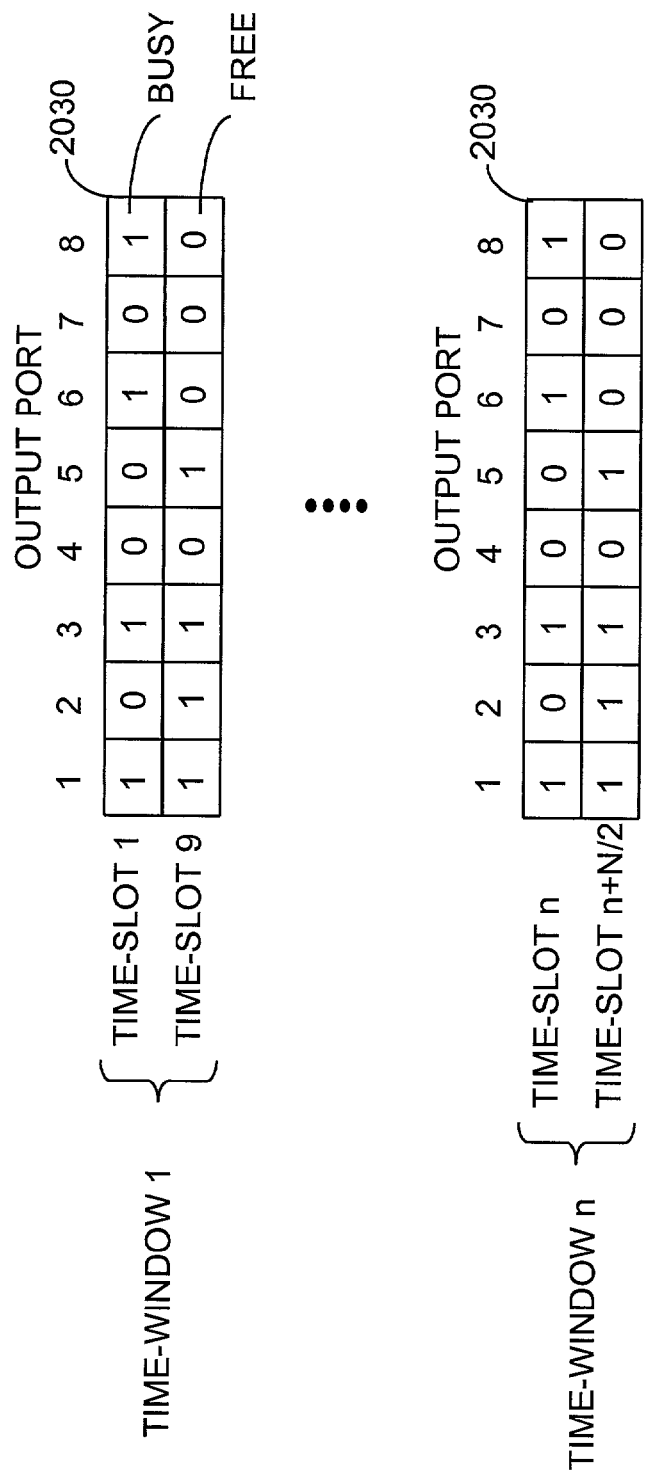
FIG. 20 illustrates the content of an output-state memory during a time window.

FIG. 20 illustrates a scheduling time window having two non-adjacent time slots, corresponding to FIG. 17. A counterpart time window corresponding to FIG. 18 would be indexed by middle-memory instead of time slot. Note that a row in FIG. 17 corresponds to a time slot in a scheduling frame while a row in FIG. 18 corresponds to a middle memory in a rotator-based switching fabric. In a rotator-based switching fabric, with a scheduling frame comprising an integer multiple (usually one) of a rotator cycle, there is a correspondence between a time slot and a middle memory as viewed by a given input port.

A matching window comprises a number of time slots which are preferably non-consecutive.

When N is very large, over 1,000 ports for example, the direct matching process as described above can still be time consuming because each matching attempt during a time slot may require inspecting a large number of entries in a corresponding row in the output-state matrix. A large proportion of entries is likely to be irrelevant, having no corresponding traffic demand. Restated, there may be too many entries to inspect, most of which may correspond to non-existing traffic demand. As an alternative to bitrate demand matrices, nominal data queue occupancy derived from required bitrate allocations may be arranged in a demand ring-list and a predetermined number of entries in the demand ring-list may be used during each matching window. A demand ring-list may be structured in at least two ways. In the structure of FIG. 21A, illustrating an aggregate-demand ring list, an initial demand ring-list has a number of records 2110 that is less than or equal to the number of output ports 414 for which data segments are to be scheduled. In an aggregate-demand ring-list 2100A, each record 2110 has a preceding record and a succeeding record. An exemplary record 2110A is shown to contain four fields 2112A, 2114A, 2116A and 2118A. The first field 2112A contains an identifier of a preceding record, the second field 2114A contains an identifier of a succeeding record. The third field 2116A contains an identifier of the output port 414 the corresponds to the record. The fourth field 2118A contains an indication of the number of data segments destined to the output port 414 identified in the third field 2116A. Notably, the aggregate-demand ring-list 2100A corresponds to the bitrate demand array 1904 of FIG. 19B.

The aggregate-demand ring-list 2100A is processed cyclically over successive time windows. During each time window, a number of records are processed to schedule at most a designated maximum number of data segments. With each data segment assignment, the corresponding fourth field 2118A is reduced by one. When the number of remaining data segments, as indicated by the fourth field 2118A, reaches zero, the record is deleted from the aggregate-demand ring-list 2100A. This is done by writing the content of the second field 2114A of the deleted record in the second field 2114A of the record preceding the deleted record and writing the content of the first field 2112A of the deleted record in the first field 2112 of the record succeeding the deleted record. A resultant aggregate-demand ring-list 2100B illustrates the result of scheduling the data segment queued for output port 7 and therefore deleting record 4 from the aggregate-demand ring-list 2100A.

Each record 2110A in the aggregate-demand ring-list 2100A corresponds to aggregated traffic from an input port to an output port. The aggregate-demand ring-list 2100A is therefore referenced as an Aggregate-demand ring-list.

A flat demand ring-list 2200A, as depicted in FIG. 22A, has a number of records 2210A equal to the number of data segments to be scheduled. An exemplary record 2210A has a top field 2212A, a middle field 2214A and a bottom field 2216A that correspond to the first field 2112A, the second field 2114A and the third field 2116A of the exemplary record 2110A of the aggregate-demand ring-list 2100A of FIG. 21. The flat demand ring-list 2200A is also visited cyclically and a predetermined number of records is processed during each time window. When the data segment corresponding to a record 2210A is scheduled, the record is deleted by copying the middle field 2214 of the deleted record to the middle field 2214 of the record preceding the deleted record and copying the top field 2212 of the deleted record to the top field 2212 of the record succeeding the deleted record. A resultant flat demand ring-list 2200B illustrates the result of scheduling the data segment, represented by record 13, queued for output port 8 and therefore deleting record 13 from the flat demand ring-list 2200A.

The occupancy corresponding to already scheduled data segments increases during the scheduling period and, when the occupancy is low, fewer time slots need be examined because of the higher matching-success probability. The time slots of a window, even though they are not consecutive, must be examined sequentially when a demand ring-list is used. Thus, to reduce the processing effort, the width of the matching window may be increased with scheduled occupancy. Thus, the window size, measured in time slots, can be selected as eight initially, then increased to 16 when ¼ of the segments are allocated, then to 24, when ½ of the data segments are allocated, etc. The maximum number of data segments allocated per scheduling window is ideally a constant.

Figure 23:
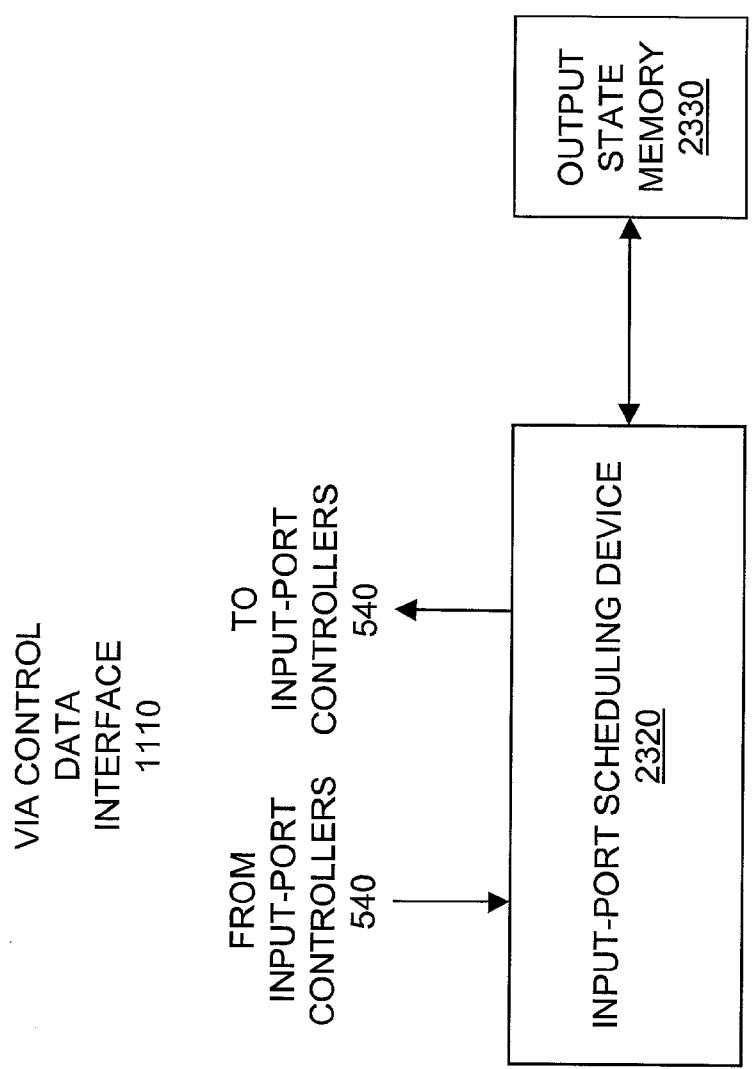
FIG. 23 schematically illustrates a packet scheduler according to an embodiment of the present invention.

FIG. 23 illustrates two components of the fabric scheduling device 1140, an input-port scheduling device 2320 and an output-port state memory 2330. Each input-port controller 540 indicates a bitrate allocation (allocated by the bitrate allocation device 1120) to the edge controller 580. At the edge controller 580, in particular, in the fabric scheduling device 1140, there may exist one input-port scheduling device 2320 dedicated to each input-port controller 540. In an alternative implementation, the input-port scheduling device 2320 may be dedicated to multiple input-port controllers 540. When a scheduling device is used for two or more input ports 412, the data from the input ports 412 are processed sequentially, one input port 412 at a time.

Figure 24:
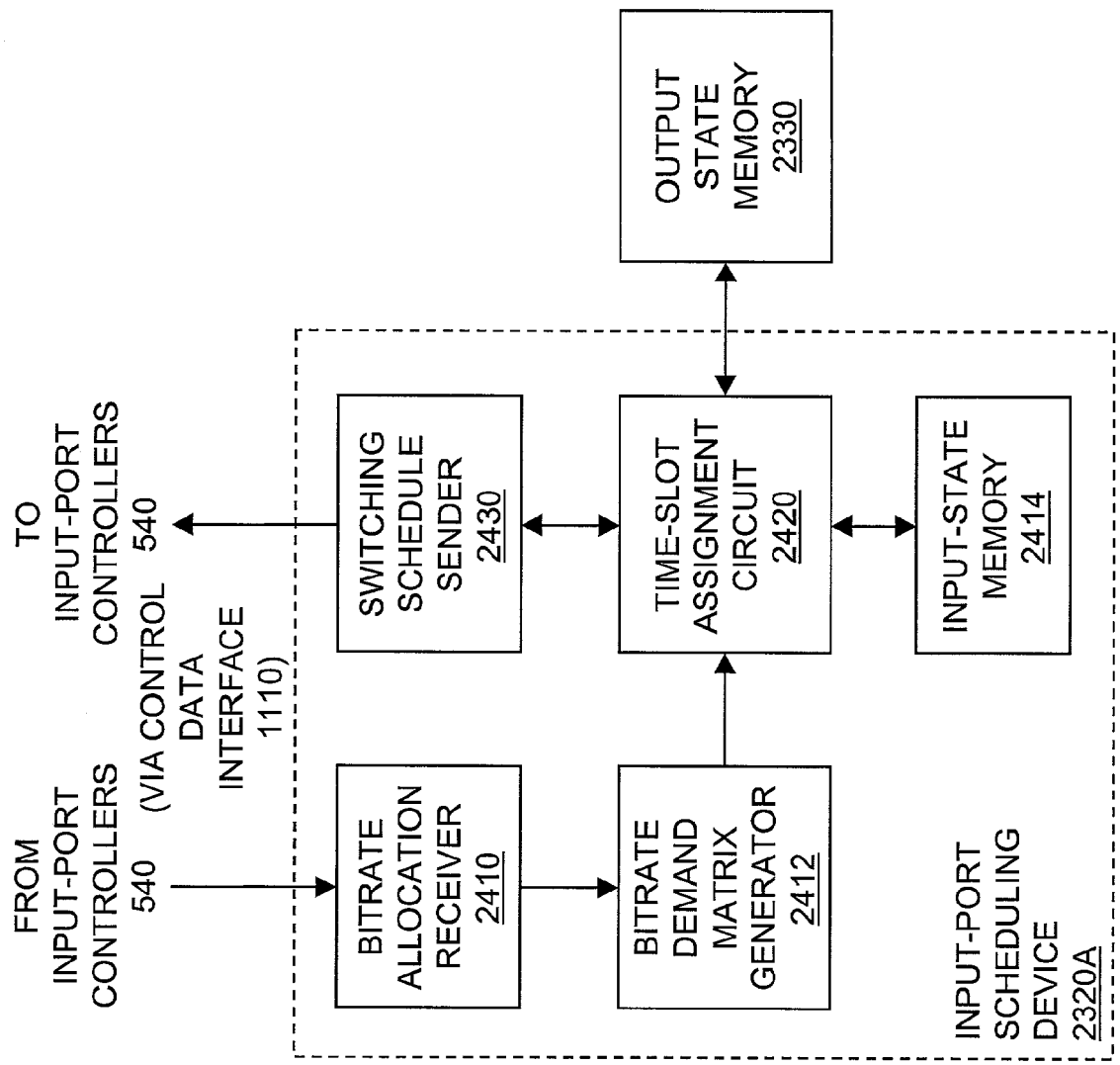
FIG. 24 illustrates an implementation of the packet scheduler of FIG. 23 according to an embodiment of the present invention.

FIG. 24 illustrates a first implementation of the input-port scheduling device 2320A that includes a time-slot assignment circuit 2420, a bitrate allocation receiver 2410, a bitrate demand matrix generator 2412, an input-state memory 2414 and a switching schedule sender 2430. The input-state memory 2414 stores an input-state array 1902 indicating the state of an input port during each time slot of a scheduling frame. It is possible that input-port scheduling device 2320 serve more than one input-port, in which case the input-state memory 2414 stores an input-state array 1902 for each input port served by the scheduler 2320. The output-state memory 2330 stores an output-state matrix 2030 for a given time window.

In operation, each input-port controller 540 may send bitrate allocations to the corresponding input-port scheduling device 2320 within the fabric scheduling device 1140 of the edge controller 580. The bitrate allocation receiver 2410 receives these bitrate allocations. The bitrate allocations are then passed to the bitrate demand matrix generator 2412 where the bitrate allocations are used to create a demand matrix, which is then stored at the bitrate demand matrix generator 2412. Recall that a bitrate demand array (see 1904, FIG. 19) for each input port 412 may be assembled to form a bitrate demand matrix. The time-slot assignment circuit 2420 reads the demand matrix stored at the bitrate demand matrix generator 2412, the input state matrix 1710 from the input state memory 2414 and the output state matrix 1720 from the output state memory 2330 and uses these matrices to determine a schedule for transferring data segments from each input port 412. The schedule, once determined, is sent by the time-slot assignment circuit 2420 to the switching schedule sender 2430, where the schedule is held until an appropriate time, at which the schedule is sent to the input-port controller 540 of the input port served by the scheduling device 2320. In a preferred implementation, a ring-list structure is used to store the bitrate allocation demand.

Figure 25:
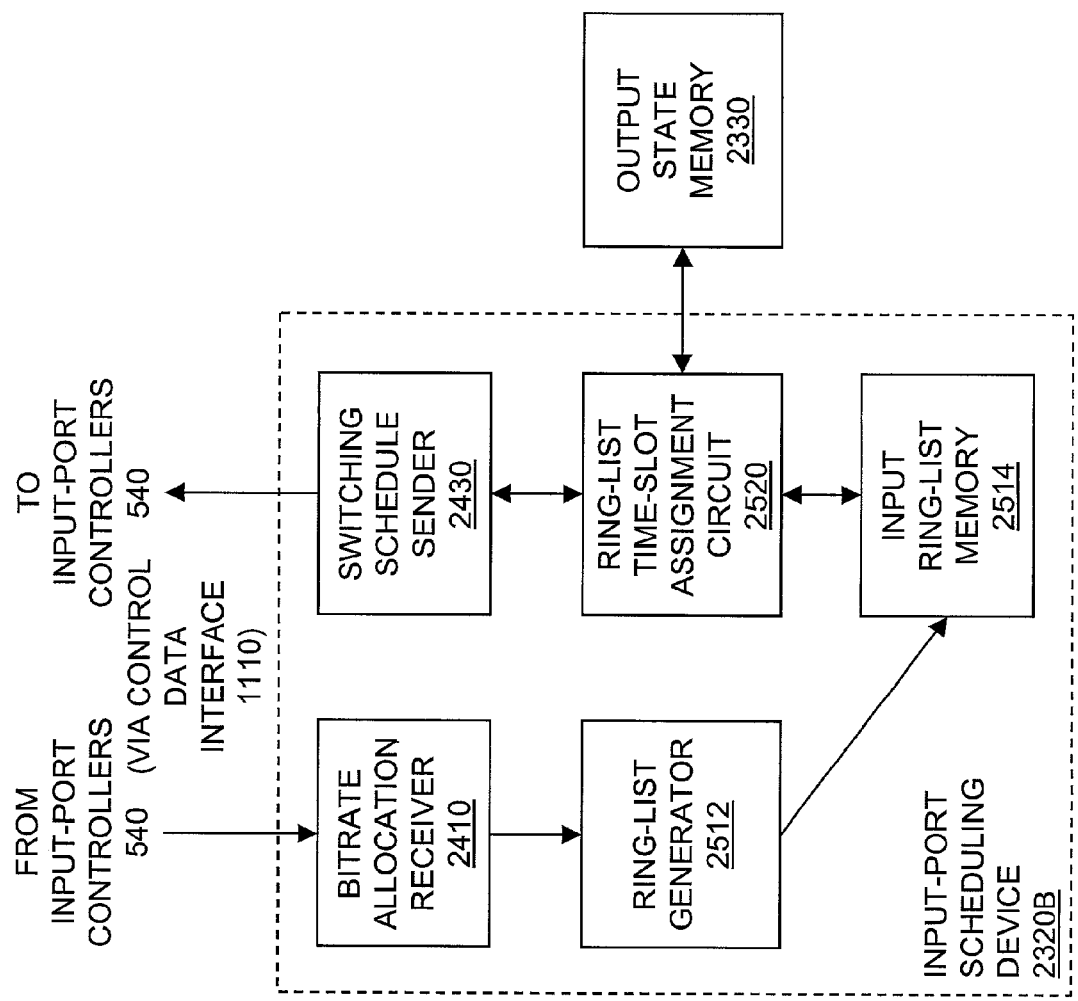
FIG. 25 illustrates another implementation of the packet scheduler of FIG. 23 according to an embodiment of the present invention.

FIG. 25 illustrates a second implementation of input-port scheduling device 2320B. In common with the first implementation of the input-port scheduling device 2320A, the second implementation of input-port scheduling device 2320B includes the bitrate allocation receiver 2410 and the switching schedule sender 2430. The second implementation of input-port scheduling device 2320B also includes a ring-list time-slot assignment circuit 2520, a demand ring-list generator 2512 and an input ring-list memory 2514.

In operation, each input-port controller 540 sends bitrate allocations to the corresponding input-port scheduling device 2320 within the fabric scheduling device 1140 of the edge controller 580. The bitrate allocation receiver 2410 receives these bitrate allocations. The bitrate allocations are then passed to the demand ring-list generator 2512, say as a flat-structure demand array (see 1906 and 1908, FIG. 19), where the bitrate allocations are used to create a demand ring-list, which is then stored at the demand ring-list generator 2512. The structure of the demand ring-list was described above with reference to FIGS. 21 and 22. The ring-list time-slot assignment circuit 2520 accesses the demand ring-list in the input ring-list memory 2414 and the output state matrix 1720 in the output state memory 2330 and uses this list and matrix to determine a schedule for transferring data segments from each input port 412 in an input-port group. The input ring-list memory 2514 for a given input port 412 stores a demand ring-list 2100 or 2200. The schedule, once determined, is sent by the ring-list time-slot assignment circuit 2520 to the switching schedule sender 2430, where the schedule is held until an appropriate time, at which the schedule is sent to the input-port controller 540 of the input port served by scheduling device 2320.

It is noteworthy that the processing effort required to schedule a single data segment is independent of the size of the data segment. It is also noteworthy that scheduling a data segment requires several logical and arithmetic operations and the processing effort depends largely on the technique used for time slot allocation to data streams. If the size of a data segment is selected to be relatively large, for example 10,000 bits, then, at a channel rate of 10 Gb/s, a segment transit duration, i.e., the time required to transfer a data segment from an input port to the switch fabric or from the switch fabric to an output port, is one microsecond. This segment transit duration can be larger than the typical time required to schedule a data segment.

As described above, a rotator-based switch eliminates the need for arbitration and real-time segment scheduling would be feasible in a large-scale fabric, having for example 8,192 dual ports (a dual port is a paired input port and output port) each operating at 10 Gb/s, with a data segment size of the order of 10,000 bits. With a data segment of 1,000 bits, the arbitration time per data segment in a space switch can be many orders of magnitude higher than a segment transfer time while a matching processing time per data segment in a rotator-based fabric would less than an order of magnitude higher than the transfer time of a data segment.

The unified scheduling technique, according to the present invention, described with reference to FIGS. 17 to 22, applies to both space switches and rotator-based switches. The fabric of a rotator-based switch is however scalable to much higher capacities in comparison with a space switch.

Figure 26:
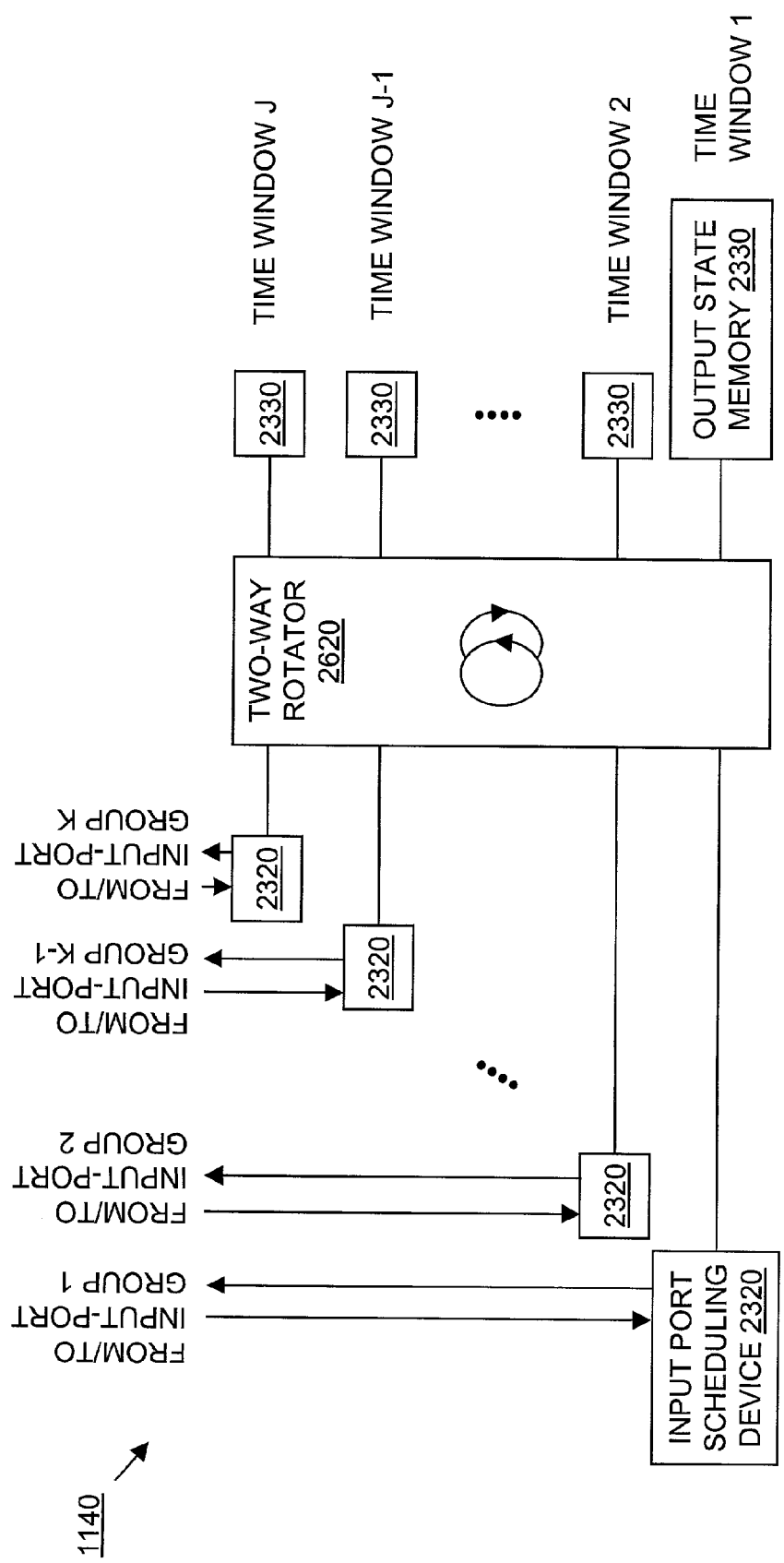
FIG. 26 illustrates an assembly of packet schedulers, the assembly comprising a plurality of packet schedulers of FIG. 23, according to an embodiment of the present invention.

In order to speed up the time slot allocation process, an input-port scheduling device 2320 is dedicated to each input port 412 or a number of input ports forming an input-port group and an output-state memory 2330 is dedicated to a time slot or a time-window comprising a number of time slots. In FIG. 26, a two-way rotator 2620 (unrelated to the rotators of a rotator-based switching fabric) having K inputs and W outputs cyclically connects each input-port scheduling device 2320, of which there are K, to each output-state memory 2330 for a specified scheduling time window, of which there are W. The duration of each scheduling time window is sufficient to enable the execution of a matching function, to be described below, for a predefined maximum number of data segments.

As described above, arbitration in an N×N space switch is prohibitively impractical when N is large, exceeding 1,000 for example. In order to avoid arbitration, a scheduling frame having a sufficiently large number of time slots, exceeding the number N of ports, may be used. During each time slot in a scheduling frame, each of the N input ports schedules the transfer of a specified number of data segments (preferably one) in non-intersecting time intervals. Thus, each input port scheduling device 2320 can function freely and independently in locating a time slot in which a particular output port 414 is free. During a complete rotation cycle, each input port 412 may schedule data segments for each time slot in the scheduling frame.

In order to reduce the matching blocking (i.e., where resources are available at both an input port 412 and an output port 414, but not at corresponding time slots) of a request to accommodate a required bitrate for a data stream, an interval expansion, of 4:5 for example, may be provided in the switching fabric 520. Thus, the maximum internal occupancy would be 0.8. The number of time slots to be considered in a matching process determines the probability of successful matching. If the internal occupancy at any instant is 0.7, for example, and assuming a random distribution of vacant time slots in a scheduling frame, then the inspection of 16 frame slots should yield a mean number of free locations of 4.8 and the probability of failing to find at least one matching time would be negligibly small.

Although, throughout the above, an optical core network has been assumed, the universal edge node 120 described herein should operate equally well with a bufferless electrical core network.

Other modifications will be apparent to those skilled in the art and, therefore, the invention is defined in the claims.

We claim:

1. An edge node adapted to serve a multiplicity of data streams, said edge node comprising:
   a plurality of input ports adapted to receive said data streams, wherein each of said input ports includes an input-port controller and at least one of said input ports includes a bitrate-estimation device adapted to compute a bitrate requirement for each of said data streams;
   a plurality of output ports, wherein each of said output ports includes an output-port controller;
   a switching fabric adapted to connect any of said input ports to any of said output ports; and
   an edge controller including:
      an edge control processor adapted to communicate with said plurality of input ports and said plurality of output ports;
      a route selection device, in communication with said edge control processor, adapted to select a route for each of said data streams;
      a fabric scheduling device, in communication with said edge control processor, adapted to determine a distinct time of transfer for each of a set of data segments, into which each of said data streams are segmented, across said switching fabric; and
      a bitrate-allocation device, in communication with said edge control processor, adapted to allocate a bitrate of a data stream based, at least in part, on said bitrate requirement for said data stream computed by said bitrate-estimation device.

2. The edge node of claim 1 wherein said switching fabric has a greater number of output ports than input ports.

3. The edge node of claim 1 wherein at least one of said output ports includes a time locking device adapted to control a data transmit time from said at least one of said output ports.

4. The edge node of claim 1 wherein said switching fabric is a common-memory fabric.

5. The edge node of claim 1 wherein said switching fabric is a space-switching fabric.

6. The edge node of claim 1 wherein said switching fabric is a rotator-based fabric.

7. The edge node of claim 1 wherein said switching fabric switches entire channels.

8. The edge node of claim 1 wherein said switching fabric switches data segments of time-shared channels.

9. The edge node of claim 1 wherein at least one of said plurality of input ports is a source port adapted to receive data from data sources and at least one of said plurality of input ports is a receiving port adapted to receive data from core nodes and other edge nodes.

10. The edge node of claim 1 wherein at least one of said plurality of output ports is a sink port adapted to transmit data to data sinks and at least one of said plurality of output ports is a departure port adapted to transmit data to core nodes and other edge nodes.

11. The edge node of claim 10 wherein each of said plurality of output ports is adapted to collate said data segments.

12. The edge node of claim 11 wherein said departure port is a time-locking departure port, said time-locking departure port including data buffers and time-locking circuitry.

13. The edge node of claim 1 wherein said bitrate-estimation device is adapted to base said bitrate requirement for each of said data streams on parameters associated with said each of said data streams.

14. The edge node of claim 1 where said bitrate-estimation device further comprises a hysteresis-control device adapted to base said bitrate requirement for each of said data streams on usage measurements associated with said each of said data streams.

15. The edge node of claim 14 wherein said input-port controller further comprises an input buffer and said hysteresis-control device comprises:
   an on-off hysteresis-control unit adapted to:

determine an admission state of either accept or reject based on an occupancy of said input buffer; and reject a request for a new connection for a data stream when said admission state is reject;

an incremental hysteresis-control unit adapted to request bitrate allocation increments.

16. An edge node for high-speed traffic processing comprising:

a switching fabric;

a plurality of input ports in communication with said switching fabric, each of said plurality of input ports having an input-port controller and at least one of said input orts including a bitrate-allocation-requirement estimator adapted to compute bitrate requirements for data streams;

a plurality of output ports in communication with said switching fabric, each of said plurality of output ports having an output-port controller; and an edge node controller in communication with said switching fabric, each of said input-port controllers and each of said output-port controllers, said edge node controller including a high-speed scheduling device, said high-speed scheduling device operable to:

receive bitrate allocation information from at least one input-port controller, said bitrate allocation information including a bitrate requirement for a given data stream computed by said bitrate-allocation-requirement estimator;

allocate a bitrate to a given data stream based, at least in part, on said bitrate requirement;

maintain a state of a given input port associated with said at least one input-port controller;

maintain a state of each of said plurality of output ports;

assign time slots of a scheduling frame to communicate data segments from said given input port to one or more of said output ports, where the number of said time slots allocated to a given output port is based on said bitrate allocation information; and transmit said scheduling frame to said corresponding input-port controller.

17. The edge node of claim 16 wherein at least one of said output port controllers further includes a time-locking device for time-locking a corresponding one of said plurality of output ports to a core node.

18. The edge node of claim 16 wherein at least one of said input port controllers comprises a destination identifier adapted to translate an Internet Protocol address.

19. The edge node of claim 16 wherein at least one of said input port controllers includes a data formatter adapted to segment a received data stream into equal sized data segments.

20. The edge node of claim 16 wherein said bitrate-allocation-requirement estimator is adapted to control requests for changes in bitrate allocation.

21. The edge node of claim 16 wherein said input-port controller is adapted to receive a data stream that specifies a destination and an explicit bitrate allocation requirement and wherein said edge node controller is adapted to provide a route to said destination having said explicit bitrate allocation requirement.

22. The edge node of claim 16 wherein said input-port controller is adapted to receive a data stream that specifies a destination, said bitrate-allocation-requirement estimator is adapted to estimate a bitrate allocation requirement for said data stream and wherein said edge node controller is adapted to provide a route to said destination having said estimated bitrate allocation requirement.

23. The edge node of claim 22 wherein:

said bitrate-allocation-requirement estimator is adapted to estimate said bitrate allocation requirement according to a hysteresis-control mechanism; and said input-port controller is adapted to transmit a request for a change in said estimated bitrate allocation requirement for said data stream.

\* \* \* \* \*